US008841005B2

(12) United States Patent
Mirchandani et al.

(10) Patent No.: US 8,841,005 B2
(45) Date of Patent: Sep. 23, 2014

(54) ARTICLES HAVING IMPROVED RESISTANCE TO THERMAL CRACKING

(71) Applicant: Kennametal Inc., Latrobe, PA (US)

(72) Inventors: Prakash K. Mirchandani, Houston, TX (US); Alfred J. Mosco, Spring, TX (US); Eric W. Olsen, Cypress, TX (US); Steven G. Caldwell, Hendersonville, TN (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 13/632,178
(22) Filed: Oct. 1, 2012
(65) Prior Publication Data
US 2013/0028672 A1 Jan. 31, 2013

Related U.S. Application Data

(63) Continuation of application No. 13/182,474, filed on Jul. 14, 2011, which is a continuation of application
(Continued)

(51) Int. Cl.
| | |
|---|---|
| B23B 27/10 | (2006.01) |
| E21B 10/46 | (2006.01) |
| B26D 7/08 | (2006.01) |
| B23B 27/16 | (2006.01) |
| B23B 27/14 | (2006.01) |
| B22F 7/06 | (2006.01) |
| C22C 29/06 | (2006.01) |
| E21B 10/52 | (2006.01) |
| B23B 27/04 | (2006.01) |
| E21B 10/567 | (2006.01) |
| B22F 5/00 | (2006.01) |

(52) U.S. Cl.
CPC ............. *C22C 29/06* (2013.01); *B23B 2226/12* (2013.01); *B23B 2226/72* (2013.01); *B23B 27/141* (2013.01); *B23B 27/10* (2013.01); *C22C 2204/00* (2013.01); *B23B 2222/24* (2013.01); *B23B 2222/04* (2013.01); *B23B 2224/08* (2013.01); *B22F 2998/00* (2013.01); *B23B 2222/28* (2013.01); *B22F 7/062* (2013.01); *B23B 2222/76* (2013.01); *B23B 2250/125* (2013.01); *B22F 2005/002* (2013.01); *E21B 10/52* (2013.01); *B23B 2250/12* (2013.01); *B23B 2226/31* (2013.01); *B22F 2005/001* (2013.01); *B23B 27/045* (2013.01); *E21B 10/567* (2013.01)
USPC ............... 428/698; 428/212; 428/548; 419/6; 175/425; 72/252.5; 277/650

(58) Field of Classification Search
None
See application file for complete search history.

(56) References Cited

U.S. PATENT DOCUMENTS

| | | |
|---|---|---|
| 1,509,438 A | 9/1924 | Miller |
| 1,530,293 A | 3/1925 | Breitenstein |

(Continued)

FOREIGN PATENT DOCUMENTS

| | | |
|---|---|---|
| AU | 695583 | 2/1998 |
| CA | 1018474 A | 10/1977 |

(Continued)

OTHER PUBLICATIONS

Nassau, K. Ph.D. and Julia Nassau, "The History and Present Status of Synthetic Diamond, Part I and II", reprinted from the Lapidary Journal, Inc., vol. 32, No. 1, Apr. 1978; vol. 32, No. 2, May 1978, 15 pages.

(Continued)

*Primary Examiner* — Vera Katz
(74) *Attorney, Agent, or Firm* — Matthew W. Gordon, Esq.

(57) ABSTRACT

An article includes a working portion including cemented carbide, and a heat sink portion in thermal communication with the working portion. The heat sink portion includes a heat sink material having a thermal conductivity greater than a thermal conductivity of the cemented carbide. Also disclosed are methods of making an article including a working portion comprising cemented carbide, and a heat sink portion in thermal communication with the working portion and including a heat sink material having a thermal conductivity that is greater than a thermal conductivity of the cemented carbide. The heat sink portion conducts heat from the working portion.

15 Claims, 13 Drawing Sheets

SECTION A-A

Related U.S. Application Data

No. 11/924,273, filed on Oct. 25, 2007, now Pat. No. 8,007,922.

(60) Provisional application No. 60/854,348, filed on Oct. 25, 2006.

(56) References Cited

U.S. PATENT DOCUMENTS

| | | |
|---|---|---|
| 1,808,138 A | 6/1931 | Hogg et al. |
| 1,811,802 A | 6/1931 | Newman |
| 1,912,298 A | 5/1933 | Newman |
| 2,054,028 A | 9/1936 | Benninghoff |
| 2,093,507 A | 9/1937 | Bartek |
| 2,093,742 A | 9/1937 | Staples |
| 2,093,986 A | 9/1937 | Staples |
| 2,240,840 A | 5/1941 | Fischer |
| 2,246,237 A | 6/1941 | Benninghoff |
| 2,283,280 A | 5/1942 | Nell |
| 2,299,207 A | 10/1942 | Bevillard |
| 2,351,827 A | 6/1944 | McAllister |
| 2,422,994 A | 6/1947 | Taylor |
| 2,819,958 A | 1/1958 | Abkowitz et al. |
| 2,819,959 A | 1/1958 | Abkowitz et al. |
| 2,906,654 A | 9/1959 | Abkowitz |
| 2,954,570 A | 10/1960 | Couch |
| 3,041,641 A | 7/1962 | Hradek et al. |
| 3,093,850 A | 6/1963 | Kelso |
| 3,368,881 A | 2/1968 | Abkowitz et al. |
| 3,471,921 A | 10/1969 | Feenstra |
| 3,482,295 A | 12/1969 | Trent |
| 3,490,901 A | 1/1970 | Hachisuka et al. |
| 3,581,835 A | 6/1971 | Stebley |
| 3,629,887 A | 12/1971 | Urbanic |
| 3,660,050 A | 5/1972 | Iler et al. |
| 3,757,879 A | 9/1973 | Wilder et al. |
| 3,762,882 A | 10/1973 | Grutza |
| 3,776,655 A | 12/1973 | Urbanic |
| 3,782,848 A | 1/1974 | Pfeifer |
| 3,806,270 A | 4/1974 | Tanner et al. |
| 3,812,548 A | 5/1974 | Theuerkaue |
| 3,855,444 A | 12/1974 | Palena |
| 3,889,516 A | 6/1975 | Yankee et al. |
| RE28,645 E | 12/1975 | Aoki et al. |
| 3,936,295 A | 2/1976 | Cromwell et al. |
| 3,942,954 A | 3/1976 | Frehn |
| 3,980,549 A | 9/1976 | Grutza |
| 3,987,859 A | 10/1976 | Lichte |
| 4,009,027 A | 2/1977 | Naidich et al. |
| 4,017,480 A | 4/1977 | Baum |
| 4,047,828 A | 9/1977 | Makely |
| 4,094,709 A | 6/1978 | Rozmus |
| 4,097,180 A | 6/1978 | Kwieraga |
| 4,097,275 A | 6/1978 | Horvath |
| 4,105,049 A | 8/1978 | Anderson |
| 4,106,382 A | 8/1978 | Salje et al. |
| 4,126,652 A | 11/1978 | Oohara et al. |
| 4,128,136 A | 12/1978 | Generoux |
| 4,170,499 A | 10/1979 | Thomas et al. |
| 4,181,505 A | 1/1980 | De Vries et al. |
| 4,198,233 A | 4/1980 | Frehn |
| 4,221,270 A | 9/1980 | Vezirian |
| 4,229,638 A | 10/1980 | Lichte |
| 4,233,720 A | 11/1980 | Rozmus |
| 4,255,165 A | 3/1981 | Dennis et al. |
| 4,270,952 A | 6/1981 | Kobayashi |
| 4,276,788 A | 7/1981 | van Nederveen |
| 4,277,106 A | 7/1981 | Sahley |
| 4,277,108 A | 7/1981 | Wallace |
| 4,306,139 A | 12/1981 | Shinozaki et al. |
| 4,311,490 A | 1/1982 | Bovenkerk et al. |
| 4,325,994 A | 4/1982 | Kitashima et al. |
| 4,327,156 A | 4/1982 | Dillon et al. |
| 4,331,741 A | 5/1982 | Wilson |
| 4,340,327 A | 7/1982 | Martins |
| 4,341,557 A | 7/1982 | Lizenby |
| 4,351,401 A | 9/1982 | Fielder |
| 4,376,793 A | 3/1983 | Jackson |
| 4,389,952 A | 6/1983 | Dreier et al. |
| 4,396,321 A | 8/1983 | Holmes |
| 4,398,952 A | 8/1983 | Drake |
| 4,423,646 A | 1/1984 | Bernhardt |
| 4,478,297 A | 10/1984 | Radtke |
| 4,497,358 A | 2/1985 | Gnadig et al. |
| 4,499,048 A | 2/1985 | Hanejko |
| 4,499,795 A | 2/1985 | Radtke |
| 4,520,882 A | 6/1985 | van Nederveen |
| 4,526,748 A | 7/1985 | Rozmus |
| 4,547,104 A | 10/1985 | Holmes |
| 4,547,337 A | 10/1985 | Rozmus |
| 4,550,532 A | 11/1985 | Fletcher, Jr. et al. |
| 4,552,232 A | 11/1985 | Frear |
| 4,553,615 A | 11/1985 | Grainger |
| 4,554,130 A | 11/1985 | Ecer |
| 4,562,990 A | 1/1986 | Rose |
| 4,574,011 A | 3/1986 | Bonjour et al. |
| 4,579,713 A | 4/1986 | Lueth |
| 4,587,174 A | 5/1986 | Yoshimura et al. |
| 4,592,685 A | 6/1986 | Beere |
| 4,596,694 A | 6/1986 | Rozmus |
| 4,597,456 A | 7/1986 | Ecer |
| 4,597,730 A | 7/1986 | Rozmus |
| 4,604,106 A | 8/1986 | Hall |
| 4,604,781 A | 8/1986 | Rankin, III |
| 4,605,343 A | 8/1986 | Hibbs, Jr. et al. |
| 4,609,577 A | 9/1986 | Long |
| 4,630,693 A | 12/1986 | Goodfellow |
| 4,642,003 A | 2/1987 | Yoshimura |
| 4,646,857 A | 3/1987 | Thompson |
| 4,649,086 A | 3/1987 | Johnson |
| 4,656,002 A | 4/1987 | Lizenby et al. |
| 4,662,461 A | 5/1987 | Garrett |
| 4,667,756 A | 5/1987 | King et al. |
| 4,686,080 A | 8/1987 | Hara et al. |
| 4,686,156 A | 8/1987 | Baldoni, II et al. |
| 4,694,919 A | 9/1987 | Barr |
| 4,708,542 A | 11/1987 | Emanuelli |
| 4,722,405 A | 2/1988 | Langford |
| 4,729,789 A | 3/1988 | Ide et al. |
| 4,735,656 A | 4/1988 | Schaefer et al. |
| 4,743,515 A | 5/1988 | Fischer et al. |
| 4,744,943 A | 5/1988 | Timm |
| 4,749,053 A | 6/1988 | Hollingshead |
| 4,752,159 A | 6/1988 | Howlett |
| 4,752,164 A | 6/1988 | Leonard, Jr. |
| 4,761,844 A | 8/1988 | Turchan |
| 4,779,440 A | 10/1988 | Cleve et al. |
| 4,780,274 A | 10/1988 | Barr |
| 4,804,049 A | 2/1989 | Barr |
| 4,809,903 A | 3/1989 | Eylon et al. |
| 4,813,823 A | 3/1989 | Bieneck |
| 4,831,674 A | 5/1989 | Bergstrom et al. |
| 4,838,366 A | 6/1989 | Jones |
| 4,861,350 A | 8/1989 | Phaal et al. |
| 4,871,377 A | 10/1989 | Frushour |
| 4,881,431 A | 11/1989 | Bieneck |
| 4,884,477 A | 12/1989 | Smith et al. |
| 4,889,017 A | 12/1989 | Fuller et al. |
| 4,899,838 A | 2/1990 | Sullivan et al. |
| 4,919,013 A | 4/1990 | Smith et al. |
| 4,923,512 A | 5/1990 | Timm et al. |
| 4,934,040 A | 6/1990 | Turchan |
| 4,943,191 A | 7/1990 | Schmitt |
| 4,956,012 A | 9/1990 | Jacobs et al. |
| 4,968,348 A | 11/1990 | Abkowitz et al. |
| 4,971,485 A | 11/1990 | Nomura et al. |
| 4,991,670 A | 2/1991 | Fuller et al. |
| 5,000,273 A | 3/1991 | Horton et al. |
| 5,010,945 A | 4/1991 | Burke |
| 5,030,598 A | 7/1991 | Hsieh |
| 5,032,352 A | 7/1991 | Meeks et al. |
| 5,041,261 A | 8/1991 | Buljan et al. |
| 5,049,450 A | 9/1991 | Dorfman et al. |
| RE33,753 E | 11/1991 | Vacchiano et al. |
| 5,067,860 A | 11/1991 | Kobayashi et al. |

(56) References Cited

U.S. PATENT DOCUMENTS

| | | |
|---|---|---|
| 5,075,315 A | 12/1991 | Rasmussen |
| 5,075,316 A | 12/1991 | Hubele |
| 5,080,538 A | 1/1992 | Schmitt |
| 5,090,491 A | 2/1992 | Tibbitts et al. |
| 5,092,412 A | 3/1992 | Walk |
| 5,094,571 A | 3/1992 | Ekerot |
| 5,096,465 A | 3/1992 | Chen et al. |
| 5,098,232 A | 3/1992 | Benson |
| 5,110,687 A | 5/1992 | Abe et al. |
| 5,112,162 A | 5/1992 | Hartford et al. |
| 5,112,168 A | 5/1992 | Glimpel |
| 5,116,659 A | 5/1992 | Glatzle et al. |
| 5,126,206 A | 6/1992 | Garg et al. |
| 5,127,776 A | 7/1992 | Glimpel |
| 5,135,801 A | 8/1992 | Nyström et al. |
| 5,161,898 A | 11/1992 | Drake |
| 5,174,700 A | 12/1992 | Sgarbi et al. |
| 5,179,772 A | 1/1993 | Braun et al. |
| 5,186,739 A | 2/1993 | Isobe et al. |
| 5,203,513 A | 4/1993 | Keller et al. |
| 5,203,932 A | 4/1993 | Kato et al. |
| 5,217,081 A | 6/1993 | Waldenström et al. |
| 5,232,522 A | 8/1993 | Doktycz et al. |
| 5,250,355 A | 10/1993 | Newman et al. |
| 5,266,415 A | 11/1993 | Newkirk et al. |
| 5,273,380 A | 12/1993 | Musacchia |
| 5,281,260 A | 1/1994 | Kumar et al. |
| 5,286,685 A | 2/1994 | Schoennahl et al. |
| 5,305,840 A | 4/1994 | Liang et al. |
| 5,311,958 A | 5/1994 | Isbell et al. |
| 5,326,196 A | 7/1994 | Noll |
| 5,333,520 A | 8/1994 | Fischer et al. |
| 5,335,738 A | 8/1994 | Waldenström et al. |
| 5,338,135 A | 8/1994 | Noguchi et al. |
| 5,346,316 A | 9/1994 | Okada et al. |
| 5,348,806 A | 9/1994 | Kojo et al. |
| 5,354,155 A | 10/1994 | Adams |
| 5,359,772 A | 11/1994 | Carlsson et al. |
| 5,373,907 A | 12/1994 | Weaver |
| 5,376,329 A | 12/1994 | Morgan et al. |
| 5,413,438 A | 5/1995 | Turchan |
| 5,423,899 A | 6/1995 | Krall et al. |
| 5,429,459 A | 7/1995 | Palm |
| 5,433,280 A | 7/1995 | Smith |
| 5,438,108 A | 8/1995 | Umemura et al. |
| 5,438,858 A | 8/1995 | Friedrichs |
| 5,443,337 A | 8/1995 | Katayama |
| 5,447,549 A | 9/1995 | Yoshimura |
| 5,452,771 A | 9/1995 | Blackman et al. |
| 5,467,669 A | 11/1995 | Stroud |
| 5,474,407 A | 12/1995 | Rodel et al. |
| 5,479,997 A | 1/1996 | Scott et al. |
| 5,480,272 A | 1/1996 | Jorgensen et al. |
| 5,482,670 A | 1/1996 | Hong |
| 5,484,468 A | 1/1996 | Östlund et al. |
| 5,487,626 A | 1/1996 | Von Holst et al. |
| 5,492,186 A | 2/1996 | Overstreet et al. |
| 5,496,137 A | 3/1996 | Ochayon et al. |
| 5,498,142 A | 3/1996 | Mills |
| 5,505,748 A | 4/1996 | Tank et al. |
| 5,506,055 A | 4/1996 | Dorfman et al. |
| 5,518,077 A | 5/1996 | Blackman et al. |
| 5,525,134 A | 6/1996 | Mehrotra et al. |
| 5,541,006 A | 7/1996 | Conley |
| 5,543,235 A | 8/1996 | Mirchandani et al. |
| 5,544,550 A | 8/1996 | Smith |
| 5,560,238 A | 10/1996 | Allebach et al. |
| 5,560,440 A | 10/1996 | Tibbitts |
| 5,570,978 A | 11/1996 | Rees et al. |
| 5,580,666 A | 12/1996 | Dubensky et al. |
| 5,586,612 A | 12/1996 | Isbell et al. |
| 5,590,729 A | 1/1997 | Cooley et al. |
| 5,593,474 A | 1/1997 | Keshavan et al. |
| 5,601,857 A | 2/1997 | Friedrichs |
| 5,603,075 A | 2/1997 | Stoll et al. |
| 5,609,286 A | 3/1997 | Anthon |
| 5,609,447 A | 3/1997 | Britzke et al. |
| 5,611,251 A | 3/1997 | Katayama |
| 5,612,264 A | 3/1997 | Nilsson et al. |
| 5,628,837 A | 5/1997 | Britzke et al. |
| RE35,538 E | 6/1997 | Akesson et al. |
| 5,641,251 A | 6/1997 | Leins et al. |
| 5,641,921 A | 6/1997 | Dennis et al. |
| 5,662,183 A | 9/1997 | Fang |
| 5,666,864 A | 9/1997 | Tibbitts |
| 5,672,382 A | 9/1997 | Lux |
| 5,677,042 A | 10/1997 | Massa et al. |
| 5,679,445 A | 10/1997 | Massa et al. |
| 5,686,119 A | 11/1997 | McNaughton, Jr. |
| 5,697,042 A | 12/1997 | Massa et al. |
| 5,697,046 A | 12/1997 | Conley |
| 5,697,462 A | 12/1997 | Grimes et al. |
| 5,704,736 A | 1/1998 | Giannetti |
| 5,712,030 A | 1/1998 | Goto et al. |
| 5,718,948 A | 2/1998 | Ederyd et al. |
| 5,732,783 A | 3/1998 | Truax et al. |
| 5,733,078 A | 3/1998 | Matsushita et al. |
| 5,733,649 A | 3/1998 | Kelley et al. |
| 5,733,664 A | 3/1998 | Kelley et al. |
| 5,750,247 A | 5/1998 | Bryant et al. |
| 5,753,160 A | 5/1998 | Takeuchi et al. |
| 5,755,033 A | 5/1998 | Gunter et al. |
| 5,755,298 A | 5/1998 | Langford, Jr. et al. |
| 5,762,843 A | 6/1998 | Massa et al. |
| 5,765,095 A | 6/1998 | Flak et al. |
| 5,776,593 A | 7/1998 | Massa et al. |
| 5,778,301 A | 7/1998 | Hong |
| 5,789,686 A | 8/1998 | Massa et al. |
| 5,791,833 A | 8/1998 | Niebauer |
| 5,792,403 A | 8/1998 | Massa et al. |
| 5,803,152 A | 9/1998 | Dolman et al. |
| 5,806,934 A | 9/1998 | Massa et al. |
| 5,830,256 A | 11/1998 | Northrop et al. |
| 5,851,094 A | 12/1998 | Stand et al. |
| 5,856,626 A | 1/1999 | Fischer et al. |
| 5,865,571 A | 2/1999 | Tankala et al. |
| 5,873,684 A | 2/1999 | Flolo |
| 5,880,382 A | 3/1999 | Fang et al. |
| 5,890,852 A | 4/1999 | Gress |
| 5,893,204 A | 4/1999 | Symonds |
| 5,897,830 A | 4/1999 | Abkowitz et al. |
| 5,899,257 A | 5/1999 | Alleweireldt et al. |
| 5,947,660 A | 9/1999 | Karlsson et al. |
| 5,957,006 A | 9/1999 | Smith |
| 5,957,755 A | 9/1999 | LaFlamme |
| 5,963,775 A | 10/1999 | Fang |
| 5,964,555 A | 10/1999 | Strand |
| 5,967,249 A | 10/1999 | Butcher |
| 5,971,670 A | 10/1999 | Pantzar et al. |
| 5,976,707 A | 11/1999 | Grab et al. |
| 5,988,953 A | 11/1999 | Berglund et al. |
| 6,007,909 A | 12/1999 | Rolander et al. |
| 6,012,882 A | 1/2000 | Turchan |
| 6,022,175 A | 2/2000 | Heinrich et al. |
| 6,029,544 A | 2/2000 | Katayama |
| 6,051,171 A | 4/2000 | Takeuchi et al. |
| 6,063,333 A | 5/2000 | Dennis |
| 6,068,070 A | 5/2000 | Scott |
| 6,073,518 A | 6/2000 | Chow et al. |
| 6,076,999 A | 6/2000 | Hedberg et al. |
| 6,086,003 A | 7/2000 | Gunter et al. |
| 6,086,980 A | 7/2000 | Foster et al. |
| 6,089,123 A | 7/2000 | Chow et al. |
| 6,109,377 A | 8/2000 | Massa et al. |
| 6,109,677 A | 8/2000 | Anthony |
| 6,117,493 A | 9/2000 | North |
| 6,135,218 A | 10/2000 | Deane et al. |
| 6,148,936 A | 11/2000 | Evans et al. |
| 6,200,514 B1 | 3/2001 | Meister |
| 6,209,420 B1 | 4/2001 | Butcher et al. |
| 6,214,134 B1 | 4/2001 | Eylon et al. |
| 6,214,287 B1 | 4/2001 | Waldenström |
| 6,220,117 B1 | 4/2001 | Butcher |
| 6,227,188 B1 | 5/2001 | Tankala et al. |

(56) References Cited

U.S. PATENT DOCUMENTS

| | | |
|---|---|---|
| 6,228,134 B1 | 5/2001 | Erickson |
| 6,228,139 B1 | 5/2001 | Oskarsson |
| 6,234,261 B1 | 5/2001 | Evans et al. |
| 6,241,036 B1 | 6/2001 | Lovato et al. |
| 6,248,277 B1 | 6/2001 | Friedrichs |
| 6,254,658 B1 | 7/2001 | Taniuchi et al. |
| 6,287,360 B1 | 9/2001 | Kembaiyan et al. |
| 6,290,438 B1 | 9/2001 | Papajewski |
| 6,293,986 B1 | 9/2001 | Rödiger et al. |
| 6,299,658 B1 | 10/2001 | Moriguchi et al. |
| 6,302,224 B1 | 10/2001 | Sherwood, Jr. |
| 6,326,582 B1 | 12/2001 | North |
| 6,345,941 B1 | 2/2002 | Fang et al. |
| 6,353,771 B1 | 3/2002 | Southland |
| 6,372,346 B1 | 4/2002 | Toth |
| 6,374,932 B1 | 4/2002 | Brady |
| 6,375,706 B2 | 4/2002 | Kembaiyan et al. |
| 6,386,954 B2 | 5/2002 | Sawabe et al. |
| 6,394,711 B1 | 5/2002 | Brosius |
| 6,395,108 B2 | 5/2002 | Eberle et al. |
| 6,402,439 B1 | 6/2002 | Puide et al. |
| 6,425,716 B1 | 7/2002 | Cook |
| 6,450,739 B1 | 9/2002 | Puide et al. |
| 6,453,899 B1 | 9/2002 | Tselesin |
| 6,454,025 B1 | 9/2002 | Runquist et al. |
| 6,454,028 B1 | 9/2002 | Evans |
| 6,454,030 B1 | 9/2002 | Findley et al. |
| 6,458,471 B2 | 10/2002 | Lovato et al. |
| 6,461,401 B1 | 10/2002 | Kembaiyan et al. |
| 6,474,425 B1 | 11/2002 | Truax et al. |
| 6,475,647 B1 | 11/2002 | Mendez Acevedo et al. |
| 6,499,917 B1 | 12/2002 | Parker et al. |
| 6,499,920 B2 | 12/2002 | Sawabe |
| 6,500,226 B1 | 12/2002 | Dennis |
| 6,502,623 B1 | 1/2003 | Schmitt |
| 6,511,265 B1 | 1/2003 | Mirchandani et al. |
| 6,541,124 B1 | 4/2003 | Suggs |
| 6,544,308 B2 | 4/2003 | Griffin et al. |
| 6,546,991 B2 | 4/2003 | Dworog et al. |
| 6,551,035 B1 | 4/2003 | Bruhn et al. |
| 6,562,462 B2 | 5/2003 | Griffin et al. |
| 6,576,182 B1 | 6/2003 | Ravagni et al. |
| 6,582,126 B2 | 6/2003 | North |
| 6,585,064 B2 | 7/2003 | Griffin et al. |
| 6,585,864 B1 | 7/2003 | Fisher et al. |
| 6,589,640 B2 | 7/2003 | Griffin et al. |
| 6,599,467 B1 | 7/2003 | Yamaguchi et al. |
| 6,607,693 B1 | 8/2003 | Saito et al. |
| 6,607,835 B2 | 8/2003 | Fang et al. |
| 6,637,528 B2 | 10/2003 | Nishiyama et al. |
| 6,648,068 B2 | 11/2003 | Robin et al. |
| 6,649,682 B1 | 11/2003 | Breton et al. |
| 6,651,757 B2 | 11/2003 | Belnap et al. |
| 6,655,481 B2 | 12/2003 | Findley et al. |
| 6,655,882 B2 | 12/2003 | Heinrich et al. |
| 6,676,863 B2 | 1/2004 | Christiaens et al. |
| 6,682,780 B2 | 1/2004 | Tzatzov et al. |
| 6,685,880 B2 | 2/2004 | Engström et al. |
| 6,688,988 B2 | 2/2004 | McClure |
| 6,695,551 B2 | 2/2004 | Silver |
| 6,706,327 B2 | 3/2004 | Blomstedt et al. |
| 6,716,388 B2 | 4/2004 | Bruhn et al. |
| 6,719,074 B2 | 4/2004 | Tsuda et al. |
| 6,725,953 B2 | 4/2004 | Truax et al. |
| 6,737,178 B2 | 5/2004 | Ota et al. |
| 6,742,608 B2 | 6/2004 | Murdoch |
| 6,742,611 B1 | 6/2004 | Illerhaus et al. |
| 6,756,009 B2 | 6/2004 | Sim et al. |
| 6,764,555 B2 | 7/2004 | Hiramatsu et al. |
| 6,766,870 B2 | 7/2004 | Overstreet |
| 6,767,505 B2 | 7/2004 | Witherspoon et al. |
| 6,772,849 B2 | 8/2004 | Oldham et al. |
| 6,782,958 B2 | 8/2004 | Liang et al. |
| 6,799,648 B2 | 10/2004 | Brandenberg et al. |
| 6,808,821 B2 | 10/2004 | Fujita et al. |
| 6,844,085 B2 | 1/2005 | Takayama et al. |
| 6,848,521 B2 | 2/2005 | Lockstedt et al. |
| 6,849,231 B2 | 2/2005 | Kojima et al. |
| 6,892,793 B2 | 5/2005 | Liu et al. |
| 6,899,495 B2 | 5/2005 | Hansson et al. |
| 6,918,942 B2 | 7/2005 | Hatta et al. |
| 6,932,172 B2 | 8/2005 | Dvorachek |
| 6,933,049 B2 | 8/2005 | Wan et al. |
| 6,948,890 B2 | 9/2005 | Svensson et al. |
| 6,949,148 B2 | 9/2005 | Sugiyama et al. |
| 6,955,233 B2 | 10/2005 | Crowe et al. |
| 6,958,099 B2 | 10/2005 | Nakamura et al. |
| 7,014,719 B2 | 3/2006 | Suzuki et al. |
| 7,014,720 B2 | 3/2006 | Iseda |
| 7,017,677 B2 | 3/2006 | Keshavan et al. |
| 7,036,611 B2 | 5/2006 | Radford et al. |
| 7,044,243 B2 | 5/2006 | Kembaiyan et al. |
| 7,048,081 B2 | 5/2006 | Smith et al. |
| 7,070,666 B2 | 7/2006 | Druschitz et al. |
| 7,080,998 B2 | 7/2006 | Hall et al. |
| 7,090,731 B2 | 8/2006 | Kashima et al. |
| 7,101,128 B2 | 9/2006 | Hansson |
| 7,101,446 B2 | 9/2006 | Takeda et al. |
| 7,112,143 B2 | 9/2006 | Muller |
| 7,125,207 B2 | 10/2006 | Craig et al. |
| 7,128,773 B2 | 10/2006 | Liang et al. |
| 7,147,413 B2 | 12/2006 | Henderer et al. |
| 7,152,701 B2 | 12/2006 | Butland et al. |
| 7,175,404 B2 | 2/2007 | Kondo et al. |
| 7,192,660 B2 | 3/2007 | Ruppi |
| 7,204,117 B2 | 4/2007 | Friedrichs |
| 7,207,401 B2 | 4/2007 | Dewey et al. |
| 7,207,750 B2 | 4/2007 | Annanolli et al. |
| 7,216,727 B2 | 5/2007 | Wardley |
| 7,231,984 B2 | 6/2007 | Jaensch |
| 7,234,541 B2 | 6/2007 | Scott et al. |
| 7,234,550 B2 | 6/2007 | Azar et al. |
| 7,235,211 B2 | 6/2007 | Griffo et al. |
| 7,238,414 B2 | 7/2007 | Benitsch et al. |
| 7,244,519 B2 | 7/2007 | Festeau et al. |
| 7,250,069 B2 | 7/2007 | Kembaiyan et al. |
| 7,261,782 B2 | 8/2007 | Hwang et al. |
| 7,262,240 B1 | 8/2007 | Breton et al. |
| 7,267,187 B2 | 9/2007 | Kembaiyan |
| 7,267,543 B2 | 9/2007 | Freidhoff et al. |
| 7,270,679 B2 | 9/2007 | Istephanous et al. |
| 7,296,497 B2 | 11/2007 | Kugelberg et al. |
| 7,350,599 B2 | 4/2008 | Lockwood et al. |
| 7,381,283 B2 | 6/2008 | Lee et al. |
| 7,384,413 B2 | 6/2008 | Gross et al. |
| 7,384,443 B2 | 6/2008 | Mirchandani et al. |
| 7,395,882 B2 | 7/2008 | Oldham et al. |
| 7,410,610 B2 | 8/2008 | Woodfield et al. |
| 7,487,849 B2 | 2/2009 | Radtke |
| 7,497,280 B2 | 3/2009 | Brackin et al. |
| 7,497,396 B2 | 3/2009 | Splinter et al. |
| 7,513,320 B2 | 4/2009 | Mirchandani et al. |
| 7,524,351 B2 | 4/2009 | Hua et al. |
| 7,556,668 B2 | 7/2009 | Eason et al. |
| 7,575,620 B2 | 8/2009 | Terry et al. |
| 7,625,157 B2 | 12/2009 | Prichard et al. |
| 7,632,323 B2 | 12/2009 | Ganguly et al. |
| 7,661,491 B2 | 2/2010 | Kembaiyan et al. |
| 7,687,156 B2 | 3/2010 | Fang |
| 7,703,555 B2 | 4/2010 | Overstreet |
| 7,810,588 B2 | 10/2010 | McClain et al. |
| 7,832,456 B2 | 11/2010 | Calnan et al. |
| 7,832,457 B2 | 11/2010 | Calnan et al. |
| 7,846,551 B2 | 12/2010 | Fang et al. |
| 7,887,747 B2 | 2/2011 | Iwasaki et al. |
| 7,954,569 B2 | 6/2011 | Mirchandani et al. |
| 8,007,714 B2 | 8/2011 | Mirchandani et al. |
| 8,007,922 B2 | 8/2011 | Mirchandani et al. |
| 8,025,112 B2 | 9/2011 | Mirchandani et al. |
| 8,087,324 B2 | 1/2012 | Mirchandani et al. |
| 8,109,177 B2 | 2/2012 | Kembaiyan et al. |
| 8,137,816 B2 | 3/2012 | Fang et al. |
| 8,141,665 B2 | 3/2012 | Ganz |
| 8,221,517 B2 | 7/2012 | Mirchandani et al. |

(56) References Cited

U.S. PATENT DOCUMENTS

| | | | |
|---|---|---|---|
| 8,225,886 B2 | 7/2012 | Mirchandani et al. | |
| 8,272,816 B2 | 9/2012 | Mirchandani | |
| 2002/0004105 A1 | 1/2002 | Kunze et al. | |
| 2003/0010409 A1 | 1/2003 | Kunze et al. | |
| 2003/0041922 A1 | 3/2003 | Hirose et al. | |
| 2003/0191533 A1* | 10/2003 | Dixon et al. | 623/17.14 |
| 2003/0219605 A1 | 11/2003 | Molian et al. | |
| 2004/0013558 A1 | 1/2004 | Kondoh et al. | |
| 2004/0105730 A1 | 6/2004 | Nakajima | |
| 2004/0228695 A1 | 11/2004 | Clauson | |
| 2004/0234820 A1 | 11/2004 | Majagi | |
| 2004/0244540 A1 | 12/2004 | Oldham et al. | |
| 2004/0245022 A1 | 12/2004 | Izaguirre et al. | |
| 2004/0245024 A1 | 12/2004 | Kembaiyan | |
| 2005/0008524 A1 | 1/2005 | Testani | |
| 2005/0019114 A1* | 1/2005 | Sung | 407/119 |
| 2005/0084407 A1 | 4/2005 | Myrick | |
| 2005/0103404 A1 | 5/2005 | Hsieh et al. | |
| 2005/0117984 A1 | 6/2005 | Eason et al. | |
| 2005/0189443 A1* | 9/2005 | Taylor et al. | 239/591 |
| 2005/0194073 A1 | 9/2005 | Hamano et al. | |
| 2005/0211475 A1 | 9/2005 | Mirchandani et al. | |
| 2005/0268746 A1 | 12/2005 | Abkowitz et al. | |
| 2006/0016521 A1 | 1/2006 | Hanusiak et al. | |
| 2006/0024140 A1 | 2/2006 | Wolff et al. | |
| 2006/0032677 A1 | 2/2006 | Azar et al. | |
| 2006/0043648 A1 | 3/2006 | Takeuchi et al. | |
| 2006/0060392 A1 | 3/2006 | Eyre | |
| 2006/0185773 A1 | 8/2006 | Chiovelli | |
| 2006/0286410 A1 | 12/2006 | Ahlgren et al. | |
| 2006/0288820 A1 | 12/2006 | Mirchandani et al. | |
| 2007/0082229 A1 | 4/2007 | Mirchandani et al. | |
| 2007/0102198 A1 | 5/2007 | Oxford et al. | |
| 2007/0102199 A1 | 5/2007 | Smith et al. | |
| 2007/0102200 A1 | 5/2007 | Choe et al. | |
| 2007/0102202 A1 | 5/2007 | Choe et al. | |
| 2007/0108650 A1 | 5/2007 | Mirchandani et al. | |
| 2007/0126334 A1 | 6/2007 | Nakamura et al. | |
| 2007/0163679 A1 | 7/2007 | Fujisawa et al. | |
| 2007/0193782 A1 | 8/2007 | Fang et al. | |
| 2007/0251732 A1 | 11/2007 | Mirchandani et al. | |
| 2008/0011519 A1 | 1/2008 | Smith et al. | |
| 2008/0101977 A1 | 5/2008 | Eason et al. | |
| 2008/0196318 A1 | 8/2008 | Bost et al. | |
| 2008/0302576 A1 | 12/2008 | Mirchandani et al. | |
| 2009/0032501 A1 | 2/2009 | Swingley et al. | |
| 2009/0041612 A1 | 2/2009 | Fang et al. | |
| 2009/0136308 A1 | 5/2009 | Newitt | |
| 2009/0180915 A1 | 7/2009 | Mirchandani et al. | |
| 2009/0301788 A1 | 12/2009 | Stevens et al. | |
| 2010/0044114 A1 | 2/2010 | Mirchandani et al. | |
| 2010/0044115 A1 | 2/2010 | Mirchandani et al. | |
| 2010/0278603 A1 | 11/2010 | Fang et al. | |
| 2010/0323213 A1 | 12/2010 | Aitchison et al. | |
| 2011/0011965 A1 | 1/2011 | Mirchandani et al. | |
| 2011/0107811 A1 | 5/2011 | Mirchandani et al. | |
| 2011/0265623 A1 | 11/2011 | Mirchandani et al. | |
| 2011/0284179 A1 | 11/2011 | Stevens et al. | |
| 2011/0287238 A1 | 11/2011 | Stevens et al. | |
| 2011/0287924 A1 | 11/2011 | Stevens | |
| 2012/0237386 A1 | 9/2012 | Mirchandani et al. | |
| 2012/0240476 A1 | 9/2012 | Mirchandani et al. | |
| 2012/0241222 A1 | 9/2012 | Mirchandani et al. | |
| 2012/0282051 A1 | 11/2012 | Mirchandani | |
| 2013/0075165 A1 | 3/2013 | Coleman et al. | |

FOREIGN PATENT DOCUMENTS

| | | |
|---|---|---|
| CA | 1158073 A | 12/1983 |
| CA | 1250156 A | 2/1989 |
| CA | 2022065 A1 | 2/1991 |
| CA | 2120332 | 6/1993 |
| CA | 2107004 C | 5/1996 |
| CA | 2228398 A1 | 2/1997 |
| CA | 2198985 A1 | 9/1998 |
| CA | 2108274 C | 7/2000 |
| CA | 2212197 C | 10/2000 |
| CA | 2201969 C | 2/2003 |
| CA | 2213169 C | 3/2005 |
| CA | 2498073 A1 | 8/2006 |
| CA | 2556132 A1 | 2/2007 |
| CA | 2570937 A1 | 6/2007 |
| CA | 2357407 C | 1/2008 |
| DE | 19634314 A1 | 1/1998 |
| DE | 10300283 B3 | 6/2004 |
| DE | 102006030661 A1 | 1/2008 |
| DE | 102007006943 A1 | 8/2008 |
| EP | 0157625 A2 | 10/1985 |
| EP | 0264674 A2 | 4/1988 |
| EP | 0453428 A1 | 10/1991 |
| EP | 0605585 B1 | 8/1995 |
| EP | 0641620 B1 | 2/1998 |
| EP | 0995876 A2 | 4/2000 |
| EP | 1065021 A1 | 1/2001 |
| EP | 1066901 A2 | 1/2001 |
| EP | 1106706 A1 | 6/2001 |
| EP | 0759480 B1 | 1/2002 |
| EP | 1077268 B1 | 5/2003 |
| EP | 1244531 B1 | 10/2004 |
| EP | 1686193 A2 | 8/2006 |
| EP | 1788104 A1 | 5/2007 |
| FR | 2627541 A2 | 8/1989 |
| GB | 622041 | 4/1949 |
| GB | 945227 | 12/1963 |
| GB | 1082568 | 9/1967 |
| GB | 1309634 | 3/1973 |
| GB | 1420906 | 1/1976 |
| GB | 1491044 | 11/1977 |
| GB | 2064619 A | 6/1981 |
| GB | 2158744 A | 11/1985 |
| GB | 2218931 A | 11/1989 |
| GB | 2315452 A | 2/1998 |
| GB | 2324752 A | 11/1998 |
| GB | 2352727 A | 2/2001 |
| GB | 2384745 A | 8/2003 |
| GB | 2385350 A | 8/2003 |
| GB | 2393449 A | 3/2004 |
| GB | 2397832 A | 8/2004 |
| GB | 2409467 A | 6/2005 |
| GB | 2435476 A | 8/2007 |
| JP | 51-114307 | 10/1976 |
| JP | 51-124876 A | 10/1976 |
| JP | 56-52604 U | 5/1981 |
| JP | 59-54510 A | 3/1984 |
| JP | 59-56501 A | 4/1984 |
| JP | 59-67333 A | 4/1984 |
| JP | 59-169707 A | 9/1984 |
| JP | 59-175912 A | 10/1984 |
| JP | 60-48207 A | 3/1985 |
| JP | 60-172403 A | 9/1985 |
| JP | 60-224790 A | 11/1985 |
| JP | 61-226231 A | 10/1986 |
| JP | 61-243103 A | 10/1986 |
| JP | 61057123 B | 12/1986 |
| JP | 62-34710 A | 2/1987 |
| JP | 62-063005 A | 3/1987 |
| JP | 62-218010 A | 9/1987 |
| JP | 62-278250 A | 12/1987 |
| JP | 1-171725 A | 7/1989 |
| JP | 2-95506 A | 4/1990 |
| JP | 2-269515 A | 11/1990 |
| JP | 3-43112 A | 2/1991 |
| JP | 3-73210 A | 3/1991 |
| JP | 04-217414 A | 8/1992 |
| JP | 5-50314 A | 3/1993 |
| JP | 5-92329 A | 4/1993 |
| JP | H05-64288 U | 8/1993 |
| JP | H03-119090 U | 6/1995 |
| JP | 7-276105 A | 10/1995 |
| JP | 8-120308 A | 5/1996 |
| JP | H8-209284 | 8/1996 |
| JP | 8-294805 A | 11/1996 |
| JP | 9-11005 A | 1/1997 |

(56) References Cited

FOREIGN PATENT DOCUMENTS

| | | |
|---|---|---|
| JP | 9-192930 A | 7/1997 |
| JP | 9-253779 A | 9/1997 |
| JP | 10-138033 A | 5/1998 |
| JP | 10-156607 A | 6/1998 |
| JP | 10219385 A | 8/1998 |
| JP | H10-511740 A | 11/1998 |
| JP | 11-10409 A | 1/1999 |
| JP | 11-300516 A | 11/1999 |
| JP | 2000-237910 A | 9/2000 |
| JP | 2000-296403 A | 10/2000 |
| JP | 2000-355725 A | 12/2000 |
| JP | 2001-179517 A | 7/2001 |
| JP | 2002-097885 A | 4/2002 |
| JP | 2002-166326 A | 6/2002 |
| JP | 2002-317596 A | 10/2002 |
| JP | 2003-306739 A | 10/2003 |
| JP | 2004-160591 A | 6/2004 |
| JP | 2004-181604 | 7/2004 |
| JP | 2004-190034 A | 7/2004 |
| JP | 2004-315904 A | 11/2004 |
| JP | 2005-111581 A | 4/2005 |
| JP | 2005-519448 A | 6/2005 |
| JP | 2006-524173 A | 10/2006 |
| JP | 2006-328477 A | 12/2006 |
| KR | 20050055268 | 6/2005 |
| RU | 2135328 C1 | 8/1999 |
| RU | 2173241 C2 | 2/2000 |
| RU | 2167262 C2 | 5/2001 |
| SU | 967786 A1 | 10/1982 |
| SU | 975369 A1 | 11/1982 |
| SU | 990423 A1 | 1/1983 |
| SU | 1269922 A | 11/1986 |
| SU | 1292917 A1 | 2/1987 |
| SU | 1350322 | 11/1987 |
| UA | 6742 | 12/1994 |
| UA | 63469 C2 | 1/2006 |
| UA | 23749 U | 6/2007 |
| WO | WO 92/05009 A1 | 4/1992 |
| WO | WO 92/22390 A1 | 12/1992 |
| WO | WO 97/19201 A1 | 5/1997 |
| WO | WO 97/34726 A1 | 9/1997 |
| WO | WO 98/28455 A1 | 7/1998 |
| WO | WO 99/13121 A1 | 3/1999 |
| WO | WO 97/00734 A1 | 7/1999 |
| WO | WO 99/36590 A1 | 7/1999 |
| WO | WO 00/43628 A2 | 7/2000 |
| WO | WO 00/52217 A1 | 9/2000 |
| WO | WO 01/43899 A1 | 6/2001 |
| WO | WO 03/010350 A1 | 2/2003 |
| WO | WO 03/011508 A2 | 2/2003 |
| WO | WO 03/049889 A2 | 6/2003 |
| WO | WO 2004/053197 A2 | 6/2004 |
| WO | WO 2005/045082 A1 | 5/2005 |
| WO | WO 2005/054530 A1 | 6/2005 |
| WO | WO 2005/061746 A1 | 7/2005 |
| WO | WO 2005/106183 A1 | 11/2005 |
| WO | WO 2006/071192 A1 | 7/2006 |
| WO | WO 2006/104004 A1 | 10/2006 |
| WO | WO 2007/001870 A2 | 1/2007 |
| WO | WO 2007/022336 A2 | 2/2007 |
| WO | WO 2007/030707 A1 | 3/2007 |
| WO | WO 2007/044791 A1 | 4/2007 |
| WO | WO 2007/127680 A1 | 11/2007 |
| WO | WO 2008/098636 A1 | 8/2008 |
| WO | WO 2008/115703 A1 | 9/2008 |
| WO | WO 2011/000348 A1 | 1/2011 |
| WO | WO 2011/008439 A2 | 1/2011 |

OTHER PUBLICATIONS

Specialty Metals, "Tungchip Dispenser, An improved feeder design, to allow for accurate delivery of Tungsten Carbide granules into the molten weld pool, generated by a MIG (GMAW) welding system", (undated) 2 pages.
Dynalloy Industries, G.M.A.C.E, 2003, printed Jul. 8, 2009, 1 page.
Alloys International (Australasia) Pty. Ltd., "The Tungsten Carbide Vibratory Feeder System", (undated) 6 pages.
Dynalloy Industries, Hardhead Technology, Tungsten Carbide Pellets, 2003, printed Jul. 8, 2009, 1 page.
Lincoln Electric, MIG Carbide Vibratory Feeder Assembly, (undated) 1 page.
Wearshield Hardfacing Electrodes, Tungsten Carbide Products, (undated) 1 page.
Postalloy, The best in hardfacing, Postle Industries, Inc., (undated) 13 pages.
Postalloy, Postle Industries, Inc., Postalloy PS-98, Tungsten Matrix Alloy, (undated) 1 page.
Postalloy, Data Sheet, Postle Industries, Inc., Postalloy 299-SPL, (undated) 1 page.
Postalloy, Data Sheet, Postle Industries, Inc., Postalloy CP 63070, (undated) 1 page.
Postalloy, Data Sheet, Postle Industries, Inc., Postalloy 14 TC, (undated) 1 page.
Postalloy, Data Sheet, Postle Industries, Inc., Postalloy PS-98, A Tungsten Carbide Matrix Wire for Carbide Embedding, (undated) 1 page.
Industrial Renewal Services, Steel BOC (Basic Oxygen Furnace) & BOP (Basic Oxygen Process) Hoods, printed Nov. 8, 2007, 2 pages.
UWO Products, printed Nov. 8, 2007 from http://www.universalweld.com/products.htm, 2 pages.
Office Action mailed Jan. 23, 2013 in U.S. Appl. No. 13/652,508.
U.S. Appl. No. 13/222,324, filed Aug. 31, 2011, (36 pages).
Office Action mailed Jun. 28, 2012 in U.S. Appl. No. 13/222,324.
Office Action mailed Jul. 11, 2012 in U.S. Appl. No. 13/222,324.
Office Action mailed Nov. 6, 2012 in U.S. Appl. No. 13/222,324.
US 4,966,627, 10/1990, Keshavan et al. (withdrawn).
Coyle, T.W. and A. Bahrami, "Structure and Adhesion of Ni and Ni—WC Plasma Spray Coatings," Thermal Spray, Surface Engineering via Applied Research, Proceedings of the 1st International Thermal Spray Conference, May 8-11, 2000, Montreal, Quebec, Canada, 2000, pp. 251-254.
Deng, X. et al., "Mechanical Properties of a Hybrid Cemented Carbide Composite," International Journal of Refractory Metals and Hard Materials, Elsevier Science Ltd., vol. 19, 2001, pp. 547-552.
Gurland, Joseph, "Application of Quantitative Microscopy to Cemented Carbides," Practical Applications of Quantitative Matellography, ASTM Special Technical Publication 839, ASTM 1984, pp. 65-84.
Hayden, Matthew and Lyndon Scott Stephens, "Experimental Results for a Heat-Sink Mechanical Seal," Tribology Transactions, 48, 2005, pp. 352-361.
Metals Handbook, vol. 16 Machining, "Cemented Carbides" (ASM International 1989), pp. 71-89.
Metals Handbook, vol. 16 Machining, "Tapping" (ASM International 1989), pp. 255-267.
Peterman, Walter, "Heat-Sink Compound Protects the Unprotected," Welding Design and Fabrication, Sep. 2003, pp. 20-22.
Shi et al., "Composite Ductility—The Role of Reinforcement and Matrix", TMS Meeting, Las Vegas, NV, Feb. 12-16, 1995, 10 pages.
Sriram, et al., "Effect of Cerium Addition on Microstructures of Carbon-Alloyed Iron Aluminides," Bull. Mater. Sci., vol. 28, No. 6, Oct. 2005, pp. 547-554.
Tracey et al., "Development of Tungsten Carbide—Cobalt—Ruthenium Cutting Tools for Machining Steels" Proceedings Annual Microprogramming Workshop, vol. 14, 1981, pp. 281-292.
Underwood, *Quantitative Stereology*, pp. 23-108 (1970).
Vander Vort, "Introduction to Quantitative Metallography", Tech Notes, vol. 1, Issue 5, published by Buehler, Ltd. 1997, 6 pages.
J. Gurland, *Quantitative Microscopy*, R.T. DeHoff and F.N. Rhines, eds., McGraw-Hill Book Company, New York, 1968, pp. 279-290.
You Tube, "The Story Behind Kennametal's Beyond Blast", dated Sep. 14, 2010, http://www.youtube.com/watch?v=8_A-bYVwmU8 (3 pages) accessed on Oct. 14, 2010.
Kennametal press release on Jun. 10, 2010, http://news.thomasnet.com/companystory/Kennametal-Launches-Beyond-BLAST-TM-at-IMTS-2010-Booth-W-1522-833445 (2 pages) accessed on Oct. 14, 2010.

(56) References Cited

OTHER PUBLICATIONS

Pages from Kennametal site, https://www.kennametal.com/en-US/promotions/Beyond_Blast.jhtml (7 pages) accessed on Oct. 14, 2010.
ASM Materials Engineering Dictionary, J.R. Davis, Ed., ASM International, Fifth printing, Jan. 2006, p. 98.
Childs et al., "Metal Machining", 2000, Elsevier, p. 111.
Brookes, Kenneth J. A., "World Directory and Handbook of Hardmetals and Hard Materials", International Carbide Data, U.K. 1996, Sixth Edition, p. 42.
Firth Sterling grade chart, Allegheny Technologies, attached to Declaration of Prakash Mirchandani, Ph.D. as filed in U.S. Appl. No. 11/737,993 on Sep. 9, 2009.
Metals Handbook Desk Edition, definition of 'wear', 2nd Ed., J.R. Davis, Editor, ASM International 1998, p. 62.
McGraw-Hill Dictionary of Scientific and Technical Terms, 5th Edition, Sybil P. Parker, Editor in Chief, 1994, pp. 799, 800, 1933, and 2047.
ProKon Version 8.6, The Calculation Companion, Properties for W, Ti, Mo, Co, Ni and FE, Copyright 1997-1998, 6 pages.
TIBTECH Innovations, "Properties table of stainless steel, metals and other conductive materials", printed from http://www.tibtech.com/conductivity.php on Aug. 19, 2011, 1 page.
"Material: Tungsten Carbide (WC), bulk", MEMSnet, printed from http://www.memsnet.org/material/tungstencarbidewcbulk/ on Aug. 19, 2001, 1 page.
Williams, Wendell S., "The Thermal Conductivity of Metallic Ceramics", JOM, Jun. 1998, pp. 62-66.
Brookes, Kenneth J. A., "World Directory and Handbook of Hardmetals and Hard Materials", International Carbide Data, U.K. 1996, Sixth Edition, pp. D182-D184.
Thermal Conductivity of Metals, The Engineering ToolBox, printed from http://www.engineeringtoolbox.com/thermal-conductivity-metals-d_858.html on Oct. 27, 2011, 3 pages.
The Thermal Conductivity of Some Common Materials and Gases, The Engineering ToolBox, printed from http://www.engineeringtoolbox.com/thermal-conductivity-d_429.html on Dec. 15, 2011, 4 pages.
ASTM G65-04, Standard Test Method for Measuring Abrasion Using the Dry Sand, Nov. 1, 2004, printed from http://infostore.saiglobal.com.
Tool and Manufacturing Engineers Handbook, Fourth Edition, vol. 1, Machining, Society of Manufacturing Engineers, Chapter 12, vol. 1, 1983, pp. 12-110-12-114.
Beard, T. "The INS and OUTS of Thread Milling; Emphasis: Hole Making, Interview", Modern Machine Shop, Gardner Publications, Inc. 1991, vol. 64, No. 1, 5 pages.
Koelsch, J., "Thread Milling Takes on Tapping", Manufacturing Engineering, 1995, vol. 115, No. 4, 6 pages.
Johnson, M. "Tapping, Traditional Machining Processes", 1997, pp. 255-265.
"Thread Milling", Traditional Machining Processes, 1997, pp. 268-269.
Scientific Cutting Tools, "The Cutting Edge", 1998, printed on Feb. 1, 2000, 15 pages.
Helical Carbide Thread Mills, Schmarje Tool Company, 1998, 2 pages.
Pyrotek, Zyp Zircwash, www.pyrotek.info, Feb. 2003, 1 page.
Sims et al., "Casting Engineering", Superalloys II, Aug. 1987, pp. 420-426.
Sikkenga, "Cobalt and Cobalt Alloy Castings", Casting, vol. 15, ASM Handbook, ASM International, 2008, pp. 1114-1118.
Starck, H.C., Surface Technology, Powders for PTA-Welding, Lasercladding and other Wear Protective Welding Applications, Jan. 2011, 4 pages.
Ancormet® 101, Data Sheet, 0001-AM101-D-1, Hoeganaes, www.hoeganaes.com, 7 pages. (date unavailable).
Office Action mailed Oct. 4, 2012 in U.S. Appl. No. 13/491,638.
U.S. Appl. No. 13/558,769, filed Jul. 26, 2012 (62 pages).
U.S. Appl. No. 13/591,282, filed Aug. 22, 2012 (54 pages).
Office Action mailed Mar. 12, 2009 in U.S. Appl. No. 11/585,408.
Office Action mailed Sep. 22, 2009 in U.S. Appl. No. 11/585,408.
Office Action mailed Sep. 7, 2010 in U.S. Appl. No. 11/585,408.
Office Action mailed Feb. 16, 2011 in U.S. Appl. No. 11/585,408.
Advisory Action mailed May 3, 2011 in U.S. Appl. No. 11/585,408.
Office Action mailed Aug. 17, 2011 in U.S. Appl. No. 11/585,408.
Notice of Allowance mailed May 9, 2012 in U.S. Appl. No. 11/585,408.
Notice of Allowance mailed Jul. 20, 2012 in U.S. Appl. No. 11/585,408.
Corrected Notice of Allowability mailed Oct. 18, 2012 in U.S. Appl. No. 11/585,408.
Restriction Requirement mailed Jul. 24, 2008 in U.S. Appl. No. 11/167,811.
Office Action mailed Oct. 21, 2008 in U.S. Appl. No. 11/167,811.
Final Office Action mailed Jun. 12, 2009 in U.S. Appl. No. 11/167,811.
Office Action mailed Aug. 28, 2009 in U.S. Appl. No. 11/167,811.
Office Action mailed Mar. 2, 2010 in U.S. Appl. No. 11/167,811.
Office Action mailed Aug. 19, 2010 in U.S. Appl. No. 11/167,811.
Advisory Action Before the Filing of an Appeal Brief mailed May 12, 2010 in U.S. Appl. No. 11/167,811.
Office Action mailed Feb. 3, 2011 in U.S. Appl. No. 11/167,811.
Advisory Action mailed May 11, 2011 in U.S. Appl. No. 11/167,811.
Office Action mailed Jul. 22, 2011 in U.S. Appl. No. 11/167,811.
Office Action mailed Mar. 28, 2012 in U.S. Appl. No. 11/167,811.
Office Action mailed Mar. 19, 2009 in U.S. Appl. No. 11/737,993.
Office Action mailed Jun. 3, 2009 in U.S. Appl. No. 11/737,993.
Office Action mailed Dec. 9, 2009 in U.S. Appl. No. 11/737,993.
Office Action mailed Feb. 24, 2010 in U.S. Appl. No. 11/737,993.
Office Action mailed Jun. 29, 2010 in U.S. Appl. No. 11/737,993.
Advisory Action Before the Filing of an Appeal Brief mailed Sep. 9, 2010 in U.S. Appl. No. 11/737,993.
Pre-Brief Appeal Conference Decision mailed Nov. 22, 2010 in U.S. Appl. No. 11/737,993.
Office Action mailed Apr. 20, 2011 in U.S. Appl. No. 11/737,993.
Office Action mailed Aug. 3, 2011 in U.S. Appl. No. 11/737,993.
Office Action mailed Oct. 11, 2011 in U.S. Appl. No. 11/737,993.
Office Action mailed Jan. 6, 2012 in U.S. Appl. No. 11/737,993.
Advisory Action Before the Filing of an Appeal Brief mailed Mar. 22, 2012 in U.S. Appl. No. 11/737,993.
Notice of Allowance mailed Jul. 25, 2012 in U.S. Appl. No. 11/737,993.
Restriction Requirement mailed Sep. 17, 2010 in U.S. Appl. No. 12/397,597.
Office Action mailed Nov. 15, 2010 in U.S. Appl. No. 12/397,597.
Office Action mailed Jun. 7, 2011 in U.S. Appl. No. 12/397,597.
Advisory Action Before the Filing of an Appeal Brief mailed Aug. 31, 2011 in U.S. Appl. No. 12/397,597.
Office Action mailed Nov. 17, 2011 in U.S. Appl. No. 12/397,597.
Advisory Action mailed Jan. 26, 2012 in U.S. Appl. No. 12/397,597.
Office Action mailed Apr. 13, 2012 in U.S. Appl. No. 12/397,597.
Office Action mailed Dec. 29, 2005 in U.S. Appl. No. 10/903,198.
Office Action mailed Sep. 29, 2006 in U.S. Appl. No. 10/903,198.
Office Action mailed Mar. 27, 2007 in U.S. Appl. No. 10/903,198.
Office Action mailed Sep. 26, 2007 in U.S. Appl. No. 10/903,198.
Office Action mailed Jan. 16, 2008 in U.S. Appl. No. 10/903,198.
Office Action mailed Oct. 31, 2008 in U.S. Appl. No. 10/903,198.
Office Action mailed Apr. 17, 2009 in U.S. Appl. No. 10/903,198.
Advisory Action before mailing of Appeal Brief mailed Jun. 29, 2009 in U.S. Appl. No. 10/903,198.
Examiner's Answer mailed Aug. 17, 2010 in U.S. Appl. No. 10/903,198.
Office Action mailed Apr. 22, 2010 in U.S. Appl. No. 12/196,951.
Office Action mailed Oct. 29, 2010 in U.S. Appl. No. 12/196,951.
Office Action mailed Apr. 12, 2011 in U.S. Appl. No. 12/196,951.
Office Action mailed Oct. 19, 2011 in U.S. Appl. No. 12/196,951.
Office Action mailed Mar. 19, 2012 in U.S. Appl. No. 12/196,951.
Notice of Allowance mailed Jul. 31, 2012 in U.S. Appl. No. 12/196,951.
Office Action mailed Oct. 13, 2011 in U.S. Appl. No. 12/179,999.
Notice of Allowance mailed Apr. 30, 2012 in U.S. Appl. No. 12/179,999.

(56) References Cited

OTHER PUBLICATIONS

Office Action mailed Aug. 29, 2011 in U.S. Appl. No. 12/476,738.
Office Action mailed Dec. 21, 2011 in U.S. Appl. No. 12/476,738.
Notice of Allowance mailed Apr. 17, 2012 in U.S. Appl. No. 12/476,738.
Corrected Notice of Allowability mailed Jun. 21, 2012 in U.S. Appl. No. 12/476,738.
Office Action mailed Nov. 14, 2011 in U.S. Appl. No. 12/502,277.
Office Action mailed Jan. 20, 2012 in U.S. Appl. No. 12/502,277.
Notice of Allowance mailed Jul. 10, 2012 in U.S. Appl. No. 12/502,277.
Supplemental Notice of Allowability mailed Jul. 20, 2012 in U.S. Appl. No. 12/502,277.
Office Action mailed Mar. 15, 2012 in U.S. Appl. No. 12/464,607.
Notice of Allowance mailed Apr. 9, 2012 in U.S. Appl. No. 12/464,607.
Notice of Allowance mailed Jul. 16, 2012 in U.S. Appl. No. 12/464,607.
Office Action mailed Oct. 31, 2011 in U.S. Appl. No. 13/207,478.
Office Action mailed Mar. 2, 2012 in U.S. Appl. No. 13/207,478.
Notice of Allowance mailed Apr. 13, 2012 in U.S. Appl. No. 13/207,478.
Supplemental Notice of Allowability mailed Jun. 29, 2012 in U.S. Appl. No. 13/207,478.
Office Action mailed Dec. 5, 2011 in U.S. Appl. No. 13/182,474.
Office Action mailed Apr. 27, 2012 in U.S. Appl. No. 13/182,474.
Notice of Allowance mailed Jul. 18, 2012 in U.S. Appl. No. 13/182,474.
Notification of Reopening of Prosecution Due to Consideration of an Information Disclosure Statement Filed After Mailing of a Notice of Allowance mailed Oct. 10, 2012 in U.S. Appl. No. 13/182,474.
Office Action mailed Jun. 1, 2001 in U.S. Appl. No. 09/460,540.
Office Action mailed Dec. 1, 2001 in U.S. Appl. No. 09/460,540.
Office Action mailed Mar. 15, 2002 in U.S. Appl. No. 09/460,540.
Office Action mailed Jun. 18, 2002 in U.S. Appl. No. 09/460,540.
Notice of Allowance mailed Oct. 21, 2002 in U.S. Appl. No. 09/460,540.
Office Action mailed Jan. 16, 2007 in U.S. Appl. No. 11/013,842.
Office Action mailed Jul. 16, 2008 in U.S. Appl. No. 11/013,842.
Office Action mailed Jul. 30, 2007 in U.S. Appl. No. 11/013,842.
Notice of Allowance mailed Nov. 26, 2008 in U.S. Appl. No. 11/013,842.
Office Action mailed Oct. 13, 2006 in U.S. Appl. No. 10/922,750.
Notice of Allowance mailed May 21, 2007 for U.S. Appl. No. 10/922,750.
Supplemental Notice of Allowability mailed Jul. 3, 2007 for U.S. Appl. No. 10/922,750.
Office Action mailed May 14, 2009 in U.S. Appl. No. 11/687,343.
Office Action mailed Jan. 21, 2010 in U.S. Appl. No. 11/687,343.
Notice of Allowance mailed May 18, 2010 in U.S. Appl. No. 11/687,343.
Restriction Requirement mailed Aug. 4, 2010 in U.S. Appl. No. 12/196,815.
Office Action mailed Oct. 27, 2010 in U.S. Appl. No. 12/196,815.
Office Action mailed Nov. 17, 2010 in U.S. Appl. No. 12/196,815.
Notice of Allowance mailed Jan. 27, 2011 in U.S. Appl. No. 12/196,815.
Notice of Allowance mailed May 16, 2011 in U.S. Appl. No. 12/196,815.
Office Action mailed Aug. 31, 2007 in U.S. Appl. No. 11/206,368.
Office Action mailed Feb. 28, 2008 in U.S. Appl. No. 11/206,368.
Pre-Appeal Conference Decision mailed Jun. 19, 2008 in U.S. Appl. No. 11/206,368.
Notice of Allowance mailed Nov. 13, 2008 in U.S. Appl. No. 11/206,368.
Office Action mailed Apr. 30, 2009 in U.S. Appl. No. 11/206,368.
Notice of Allowance mailed Nov. 30, 2009 in U.S. Appl. No. 11/206,368.
Office Action mailed Sep. 2, 2011 in U.S. Appl. No. 12/850,003.
Notice of Allowance mailed Nov. 15, 2011 in U.S. Appl. No. 12/850,003.
Office Action mailed May 3, 2010 in U.S. Appl. No. 11/924,273.
Office Action mailed Oct. 14, 2010 in U.S. Appl. No. 11/924,273.
Office Action mailed Feb. 2, 2011 in U.S. Appl. No. 11/924,273.
Interview Summary mailed Feb. 16, 2011 in U.S. Appl. No. 11/924,273.
Interview Summary mailed May 9, 2011 in U.S. Appl. No. 11/924,273.
Notice of Allowance mailed Jun. 24, 2011 in U.S. Appl. No. 11/924,273.
U.S. Appl. No. 13/652,508, filed Oct. 16, 2012 (46 pages).
U.S. Appl. No. 13/652,503, filed Oct. 16, 2012 (26 pages).
U.S. Appl. No. 13/632,177, filed Oct. 1, 2012 (40 pages).
U.S. Appl. No. 13/646,857, filed Oct. 8, 2012 (36 pages).
U.S. Appl. No. 13/646,854, filed Oct. 8, 2012 (38 pages).
U.S. Appl. No. 13/647,419, filed Oct. 9, 2012 (35 pages).
Office Action mailed Feb. 27, 2013 in U.S. Appl. No. 13/550,690.
Office Action mailed Jul. 25, 2013 in U.S. Appl. No. 13/652,508.
Office Action mailed Feb. 5, 2013 in U.S. Appl. No. 13/652,503.
Office Action mailed Jul. 5, 2013 in U.S. Appl. No. 13/652,503.
Office Action mailed Apr. 5, 2013 in U.S. Appl. No. 13/632,177.
Office Action mailed May 22, 2013 in U.S. Appl. No. 13/487,323.
Notice of Allowance mailed Jul. 1, 2013 in U.S. Appl. No. 11/167,811.
Office Action mailed Nov. 16, 2012 in U.S. Appl. No. 12/397,597.
Office Action mailed Jun. 20, 2013 in U.S. Appl. No. 12/397,597.
Decision on Appeal mailed Jun. 3, 2013 in U.S. Appl. No. 10/903,198.
Office Action mailed May 16, 2013 in U.S. Appl. No. 13/182,474.
Notice of Allowance mailed Feb. 4, 2008 in U.S. Appl. No. 11/013,842.
Notice of Allowance mailed Mar. 6, 2013 in U.S. Appl. No. 13/491,638.
Shi et al., "Study on shaping technology of nanocrystalline WC-Co composite powder", Rare Metal and Materials and Engineering, vol. 33, Suppl. 1, Jun. 2004, pp. 93-96. (English abstract).
Haynes et al., Physical Constants of Inorganic Compounds, CRC Handbook of Chemistry and Physics, 93rd Edition, Internet Version 2013, downloaded May 15, 2013, 2 pages.
"Percentage by Weight to Percentage by Volume Conversion Calculator", Roseller Sunga, n.d., May 15, 2013, http://www.handymath.com/cgi-bin/dnstywtvol.cgi?sumit=Entry, 1 page.
Translated First Office Action for Chinese Patent Application No. 201210168378.3; 4 pgs.
Stephenson et al, Metal Cutting Theory and Practice, Second Edition, 2006, pp. 164-172, CRC Press, Boca Raton, FL, ISBN-0 978-08247-5888-9.
Santhanam et al, Metals Handbook Ninth Edition vol. 16 Machining, Cemented Carbides, pp. 83-84, ASM International, Metals Park, OH.

\* cited by examiner

Longitudinal Section

ARTICLES HAVING IMPROVED RESISTANCE TO THERMAL CRACKING

CROSS-REFERENCE TO RELATED APPLICATIONS

This application is a continuation application claiming priority under 35 U.S.C. §120 to U.S. patent application Ser. No. 13/182,474, filed Jul. 14, 2011 now U.S. Pat. No. 8,697,258, which in turn is a continuation application claiming priority under 35 U.S.C. §120 to U.S. patent application Ser. No. 11/924,273, filed Oct. 25, 2007, now U.S. Pat. No. 8,007,922, which in turn claims priority to U.S. Provisional Patent Application Ser. No. 60/854,348, filed Oct. 25, 2006.

FIELD OF TECHNOLOGY

This invention relates to improvements to articles comprising cemented carbides, such as cutting tools, cutting inserts, seal rings, rolling mill rolls, cutting elements for earth boring bits, as well as other articles subject to heat and/or thermal cycling. The invention also relates to methods of producing such articles. More specifically, the certain embodiments of the invention relate to cemented carbide articles with improved thermal cracking resistance.

BACKGROUND

Articles comprising cemented carbides are commonly used in applications that involve high stresses and friction, such as cutting tools or cutting inserts for use in turning, milling, and drilling; seal rings for agitators and pumps; and rolls for rolling steel. Articles comprising cemented carbides tend to fail by thermal cracking. Cracks in such articles may be initiated if the article is heated above a threshold value, and the cracks may further propagate if the article is subject to thermal cycling.

For example, earth boring (or drilling) bits are commonly employed for oil and natural gas exploration, mining, and excavation. Such earth boring bits may have fixed or rotatable cutting elements. FIG. 1 illustrates a typical rotary cone earth boring bit 10 with rotatable cutting elements 11. Cutting inserts 12, typically made from a cemented carbide, are placed in pockets fabricated on the outer surface of the cutting elements 11. Several cutting inserts 12 may be fixed to the rotatable cutting elements 11 in predetermined positions to optimize cutting.

The service life of an earth boring bit is typically a function of the wear properties of the cemented carbide inserts. One way to increase earth boring bit service life is to employ cutting inserts made of materials with improved combinations of strength, toughness, and abrasion/erosion resistance. As stated above, the cutting inserts comprise cemented carbides, a type of cemented hard particle. The choice of cemented carbides for such applications is predicated on the fact that these materials offer very attractive combinations of strength, fracture toughness, and wear resistance (i.e., properties that are extremely important to the efficient functioning of the boring or drilling bit). Cemented carbides are composites comprising a dispersed, discontinuous phase including particles of carbides of one or more of the transition metals belonging to groups IVB, VB, and VIB of the periodic table (Ti, V, Cr, Zr, Nb, Mo, Hf, Ta, and W), and a continuous binder phase (typically including cobalt, nickel, or iron) cementing together the hard particles. Among the different possible hard particle-binder combinations, cemented carbides based on tungsten carbide (WC) as the hard particle and cobalt as the binder phase are the cemented hard particles most commonly employed.

The properties of cemented carbides depend upon, among other properties, two microstructural parameters, namely, the average hard particle grain size and the weight or volume fraction of the hard particles and/or the binder. In general, the hardness and wear resistance increases as the grain size decreases and/or the binder content decreases. On the other hand, fracture toughness increases as the grain size increases and/or as the binder content increases. Thus, there is a trade-off between wear resistance and fracture toughness when selecting a cemented carbide grade for any application. As wear resistance increases, fracture toughness typically decreases, and vice versa.

FIGS. 2A-2E illustrate some of the different shapes and designs of the cemented carbide inserts typically employed in rotary cone earth boring bits. Cutting inserts for earth boring bits are typically characterized by the shape of the domed portion, such as, ovoid (FIG. 2A), ballistic (FIG. 2B), chisel (FIG. 2C), multidome (FIG. 2D), and conical (FIG. 2E). The choice of the shape and cemented carbide grade employed depends upon the type of rock to be drilled. Regardless of shape or size, all inserts have a working portion in the form of a cutting portion, and a body portion. For example, cutting insert 20 in FIG. 2A includes dome-shaped cutting portion 22 and body portion 24. Also, for example, cutting insert 30 in FIG. 2B includes ballistic-shaped cutting portion 32 and body portion 34. The cutting action is performed by the cutting portion, while the body portion provides support for the cutting portion. Most, or all, of the body portion is embedded within the bit body or cutting element, and the body portion is typically inserted into the bit body by press fitting the cutting insert into a pocket.

As previously stated, the cutting action is primarily provided by the cutting portion of the tool. The first portion of the cutting portion to begin wearing away is the top half and, in particular, the extreme tip of the cutting portion. In the case of earth boring bits, as the top of the cutting portion begins to flatten out, the efficiency of cutting decreases dramatically since the earth is being removed more by a rubbing action, as opposed to a more efficient cutting action. As rubbing action continues, considerable heat may be generated by the increase in friction between the rock and the cutting insert, thereby resulting in heating of portions of the insert. If the temperature of any portion of the article exceeds a threshold valve, cracks will be initiated at the interface of the hard particles and the binder. Thermal cycling of the article causes propagation of the cracks.

Accordingly, there is a need for improved cemented carbide cutting inserts for earth boring bits having increased resistance to thermal fatigue and cracking. More generally, there is a need for improvements to articles including a working portion including cemented carbide that may be subject to cracking caused by thermal cycling.

SUMMARY

The invention relates to improvements to articles comprising cemented carbide, wherein hard particles within the cemented carbide include carbides of at least one transition metal selected from titanium, chromium, vanadium, zirconium, hafnium, tantalum, molybdenum, niobium, and tungsten. Such articles include cutting tools, cutting inserts, seal rings, rolling mill rolls, cutting elements for earth boring bits, as well as other articles including cemented carbide subject to heat and/or thermal cycling. The invention also relates to methods of producing such articles. Certain embodiments of articles according to the present invention may include a portion comprising cemented carbide including a binder and carbides of at least one transition metal selected from titanium, chromium, vanadium, zirconium, hafnium, tantalum, molybdenum, niobium, and tungsten, and a heat sink portion comprising a material with a thermal conductivity greater than the thermal conductivity of the cemented carbide. The heat sink portion may draw heat from a working portion, which may be, for example, a contact portion or cutting portion, thereby providing improved resistance to certain modes of thermal failure.

According to one aspect of the invention, an article is provided including a working portion including cemented carbide and a heat sink portion in thermal communication with the working portion. The cemented carbide of the working portion includes a binder and hard particles of carbides of at least one transition metal selected from titanium, chromium, vanadium, zirconium, hafnium, tantalum, molybdenum, niobium, and tungsten, and the heat sink portion includes a heat sink material having a thermal conductivity greater than a thermal conductivity of the cemented carbide. According to certain non-limiting embodiments, the heat sink portion contacts a body portion of the article, wherein the body portion supports the working portion. Also, according to certain non-limiting embodiments, the working portion is at least one of a cutting portion and a contact portion. In certain non-limiting embodiments in which the working portion is a contact portion, the article is one of a rolling mill roll and a seal ring. In certain non-limiting embodiments in which the working portion is a cutting portion, the article is one of an earth boring bit, a cutting insert, a cutting tool, a rotary tool, a rotary tool insert, a drill, a knife, and a slitter.

According to another aspect of the invention, an article is provided including a cutting portion comprising cemented carbide, a body portion, and a heat sink portion in contact with the body portion. The heat sink portion includes a material having a thermal conductivity greater than a thermal conductivity of the cemented carbide, and the heat sink portion is in thermal communication with the cutting portion. In certain non-limiting embodiments, the article is one of an earth boring bit, a cutting insert, a cutting tool, a rotary tool, a rotary tool insert, a drill, a knife, and a slitter.

According to another aspect of the invention, a rolling mill roll includes a contact portion including cemented carbide, which includes a binder and hard particles of carbides of at least one transition metal selected from titanium, chromium, vanadium, zirconium, hafnium, tantalum, molybdenum, niobium, and tungsten, a body portion, and a heat sink portion. The contact portion includes a first end, an opposed second end, and an annular outer wall extending between the first end and the second end and including a contact surface. The body portion supports the contact portion and includes an annular inner wall defining a bore extending longitudinally through the rolling mill roll. The inner wall includes a recess therein. The heat sink portion includes a material having a thermal conductivity greater than a thermal conductivity of the cemented carbide and is in thermal communication with the contact portion. At least a portion of the heat sink portion is disposed within the recess and contacts the body portion.

According to another aspect of the invention, a seal ring includes a contact portion including cemented carbide, which includes a binder and hard particles of carbides of at least one transition metal selected from titanium, chromium, vanadium, zirconium, hafnium, tantalum, molybdenum, niobium, and tungsten, a body portion, and a heat sink portion. The contact portion includes a first face including a contact surface. The body portion supports the contact portion and includes a second face defining a recess in the body portion. An annular inner wall extends between the first face and the second face and defines a bore extending between and opening on the first face and the second face. The heat sink portion includes a material having a thermal conductivity greater than a thermal conductivity of the cemented carbide and is in thermal communication with the contact portion. At least a portion of the heat sink portion is disposed within the recess and contacts the body portion.

Also according to an aspect of the invention, a method of making an article includes: providing a working portion including cemented carbide, which includes a binder and hard particles of carbides of at least one transition metal selected from titanium, chromium, vanadium, zirconium, hafnium, tantalum, molybdenum, niobium, and tungsten; providing a body portion; and providing a heat sink portion in contact with the body portion and including a heat sink material having a thermal conductivity greater than a thermal conductivity of the cemented carbide. The working portion is in thermal communication with the heat sink portion. According to certain non-limiting embodiments of the method, the heat sink portion contacts the body portion. Also, according to certain non-limiting embodiments, the working portion is at least one of a cutting portion and a contact portion. In certain non-limiting embodiments of the method in which the working portion is a contact portion, the contact portion may include a contact surface and the article is one of a rolling mill roll and a seal ring. In certain non-limiting embodiments of the method in which the working portion is a cutting portion, the cutting portion may include a cutting surface and the article is one of an earth boring bit, a cutting insert, a cutting tool, a rotary tool, a rotary tool insert, a drill, a knife, and a slitter.

According to yet a further aspect of the invention, a method of making an article including a working portion and a heat sink portion in thermal communication with the working portion includes: partially filling a void of a mold with a cemented carbide powder including a powdered binder and hard particulate carbides of at least one transition metal selected from titanium, chromium, vanadium, zirconium, hafnium, tantalum, molybdenum, niobium, and tungsten; disposing a solid heat sink material in the void; and sintering the cemented carbide powder. The method provides a sintered article including the working portion, which includes cemented carbide, and a solid heat sink portion that is in thermal communication with the working portion.

According to yet another aspect of the invention, a method of making an article including a working portion, a body portion that supports the working portion, and heat sink portion in thermal communication with the working portion is provided. A sintered body comprising cemented carbide is prepared. A heat sink material is added to the sintered body. The heat sink material has a thermal conductivity greater than a thermal conductivity of the cemented carbide. In certain embodiments, the working portion is a contact portion including cemented carbide and a contact surface. In certain other embodiments, the working portion is a cutting portion including cemented carbide and includes a cutting surface. The heat sink portion contacts the body portion and conducts heat from the working portion.

A further aspect of the invention relates to a method of making an article including at least a working portion and a heat sink portion in thermal communication with the working portion. The method includes partially filling a void of a mold with a first cemented carbide powder, and at least partially filling a remainder of the void with a second cemented carbide powder comprising a fugitive material having a melting temperature lower than a sintering temperature of the second cemented carbide powder. The first cemented carbide powder and the second cemented carbide powder are consolidated to form a green compact, and the green compact is sintered to remove the fugitive material and form a sintered article comprising a region of a first cemented carbide and a region of a second cemented carbide including interconnected porosity. A heat sink material is infiltrated into the interconnected porosity of the second cemented carbide, wherein the heat sink material has thermal conductivity greater than the first cemented carbide.

The reader will appreciate the foregoing details and advantages of the present invention, as well as others, upon consideration of the following detailed description of embodiments of the invention. The reader also may comprehend such additional details and advantages of the present invention upon making and/or using embodiments within the present invention.

BRIEF DESCRIPTION OF THE FIGURES

The features and advantages of the present invention may be better understood by reference to the accompanying figures in which.

DESCRIPTION OF VARIOUS EMBODIMENTS

Figure 1:
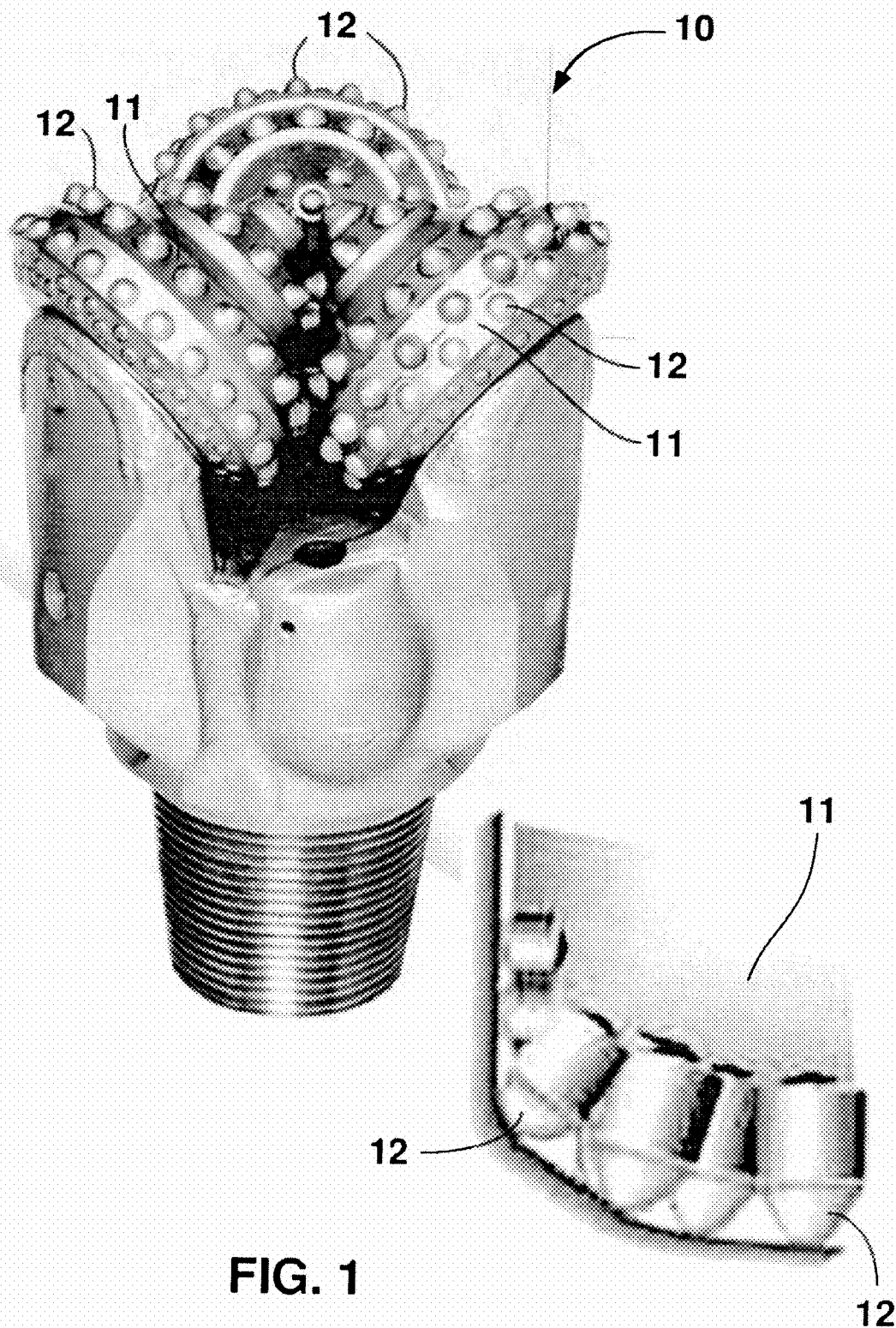
FIG. 1 illustrates a typical rotary cone earth boring drill bit comprising a bit body, roller cones, and cutting inserts.

Unless otherwise indicated, all numbers expressing quantities of ingredients, time, temperatures, and so forth used in the present specification and claims are to be understood as being modified in all instances by the term "about." Accordingly, unless indicated to the contrary, the numerical parameters set forth in the following specification and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, may inherently contain certain errors necessarily resulting from the standard deviation found in their respective testing measurements.

Embodiments of the present invention include articles comprising cemented carbide and a heat sink material. As used herein, the term "cemented carbide" refers a composite material including a discontinuous phase comprising hard particles and continuous phase of binder cementing together the hard particles. The hard particles comprise carbides of at least one transition metal selected from Groups IVB, VB, and VIB of the periodic table (titanium, chromium, vanadium, zirconium, hafnium, tantalum, molybdenum, niobium, and tungsten). Cemented carbides in which the hard particles consist of transition metal carbides are referred to herein as "cemented transition metal carbides". Embodiments of articles according to the present invention may comprise a working portion including cemented carbide and a heat sink portion including a heat sink material. The articles also may include a body portion supporting the working portion. Examples of embodiments of the present invention include, but are not limited to, a rolling mill roll, a seal ring, an earth boring bit, a cutting insert, a cutting tool, a rotary tool, a rotary tool insert, a drill, a knife, and a slitter.

As used herein, the term "working portion" means the portion of an article involved in performing an intended function of the article. For example, an earth boring bit, a cutting insert, a cutting tool, a rotary tool, a rotary tool insert, a drill, a knife, and a slitter function to remove and/or separate a target material, and a working portion of such articles is a cutting portion adapted for removing and/or separating the material. A cutting portion may include a cutting surface, which is a surface of the cutting portion that acts to remove or separate the target material. According to another example, a rolling mill roll functions to contact a workpiece and thereby exert a mechanical force on and modify the workpiece's shape. A working portion of a rolling mill roll is a contact portion, which is a portion of the roll that contacts the workpiece while performing the roll's intended function. The contact portion may also comprise a contact surface, which is a surface of the contact portion that contacts the workpiece. According to yet another example, a seal ring (also known as a sealing ring) functions to create a mechanical seal at the interface between two or more parts, and a working portion of a seal ring also is a contact portion, which may include a contact surface that contacts one or more of the parts.

Also, as used herein, a "body portion" refers to a portion of the article that supports the working portion. The body portion and working portion may be, but need not be, regions of a unitary article. As such, it will be understood that in certain embodiments of an article according to the present invention, there may not exist a clear line of division between working portion and body portion. In such embodiments, however, an ordinarily skilled person will recognize a difference between the portions in that the working portion will be adapted to carry out the intended function of the article, while the body portion will be adapted to support the working portion. Alternatively, the working portion and body portion may be formed of different materials and otherwise securely attached or bonded together so that the body portion provides the requisite support for the working portion when the article is in service.

Embodiments of the present invention include articles comprising a working portion and a heat sink portion, wherein the heat sink portion is in thermal communication with the working portion. A heat sink material of the heat sink portion has a higher thermal conductivity than a cemented carbide of the working portion. As used herein, the term "thermal communication" means that the heat may be conducted from the working portion to the heat sink portion. The heat sink portion may contact the working portion, wherein the heat is conducted directly from the working portion to the heat sink portion. Alternatively, the heat sink portion may be in contact with a body portion and is not in contact with the working portion. In this scenario, the heat is conducted from the working portion and through the body portion to the heat sink portion.

Embodiments of the present invention include articles comprising a working portion and a heat sink portion. Additionally, the articles may include a body portion or other portions. In order to remain in thermal communication with the working portion, the heat sink portion must contact one of the article, working portion, body portion, or another portion of the article in such a manner that heat can be conducted from the working portion to the heat sink portion. To achieve thermal communication, the heat sink portion can be mechanically attached to on of the article, working portion, body portion, or other portion. As used herein, the term "mechanically attached" refers to any means of mechanically attaching a heat sink portion to another portion, including, but not limited to, application of adhesives, connecting with fasteners (for example, screws, bolts, pins) soldering, brazing, clamping, press fitting, and shrink fitting. Additionally, the heat sink portion may be mechanically attached to the article or a portion thereof by physically confining all or a region of the heat sink portion within the article or portion thereof. Other possible means of mechanically attaching the heat sink portion include, for example use of threads, slots, and keyways. Other means of mechanically attaching the heat sink portion to the article or a portion thereof will be readily apparent to one of ordinary skill upon considering the present description of the invention. Also, it will be apparent that use of adhesives, soldering, brazing, and the like must be accomplished in such a way as to allow for the requisite thermal communication between the heat sink portion and the working portion. This can be achieved, for example, by ensuring that at least some direct contact is made between the heat sink portion and the article, working portion, body portion, or other portion in a fashion as to provide a pathway for conduction of heat form the working portion to the heat sink portion. Also, according to certain embodiments, and adhesives, solder, or brazing material used to mechanically attach the working portion may have a thermal conductivity greater than the thermal conductivity of one of the working portion or cemented carbide of the working portion.

Figure 2A:
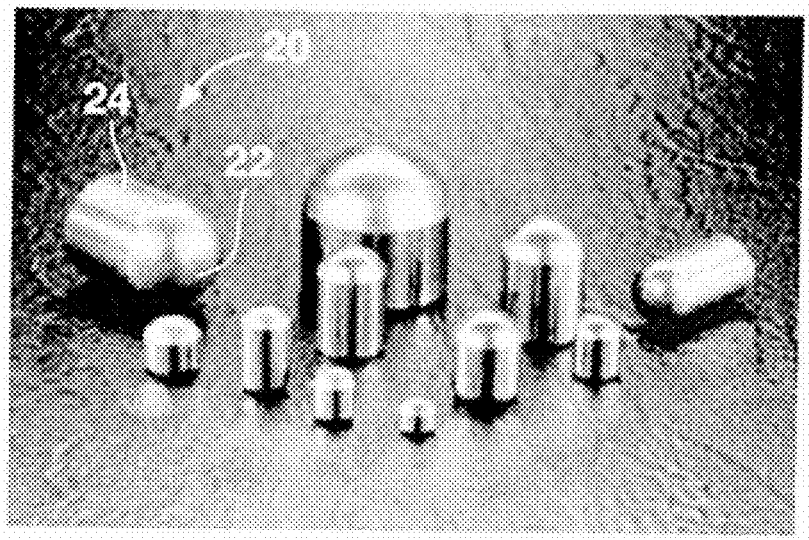
FIGS. 2A-2E illustrate different shapes and sizes of cutting inserts typically employed in rotary cone earth boring bits such as ovoid (FIG. 2A), ballistic (FIG. 2B), chisel (FIG. 2C), multidome (FIG. 2D), and conical (FIG. 2E)
Figure 2B:
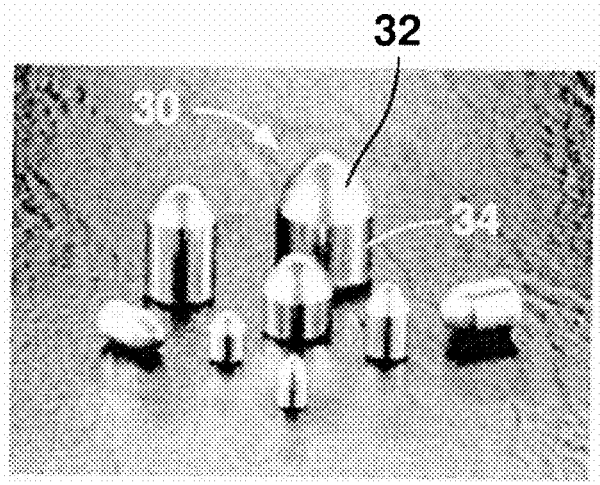
Figure 2C:
Figure 2D:
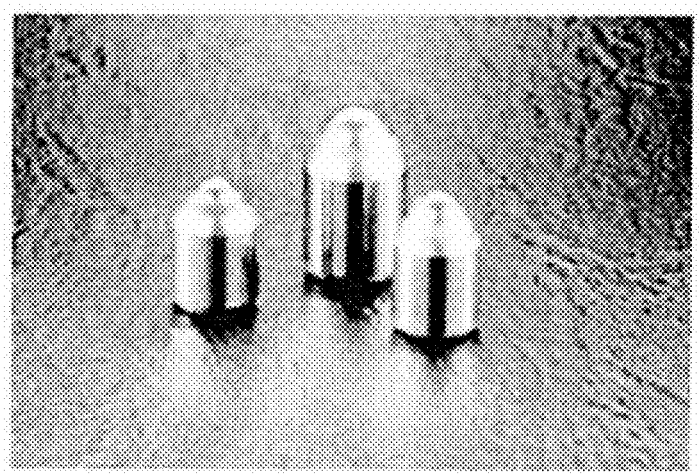
Figure 2E:
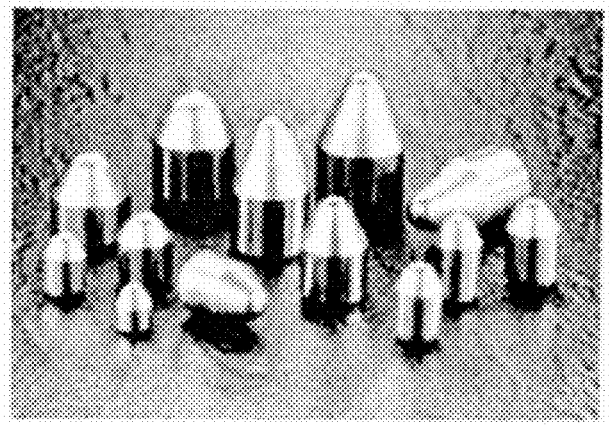
Figure 7:
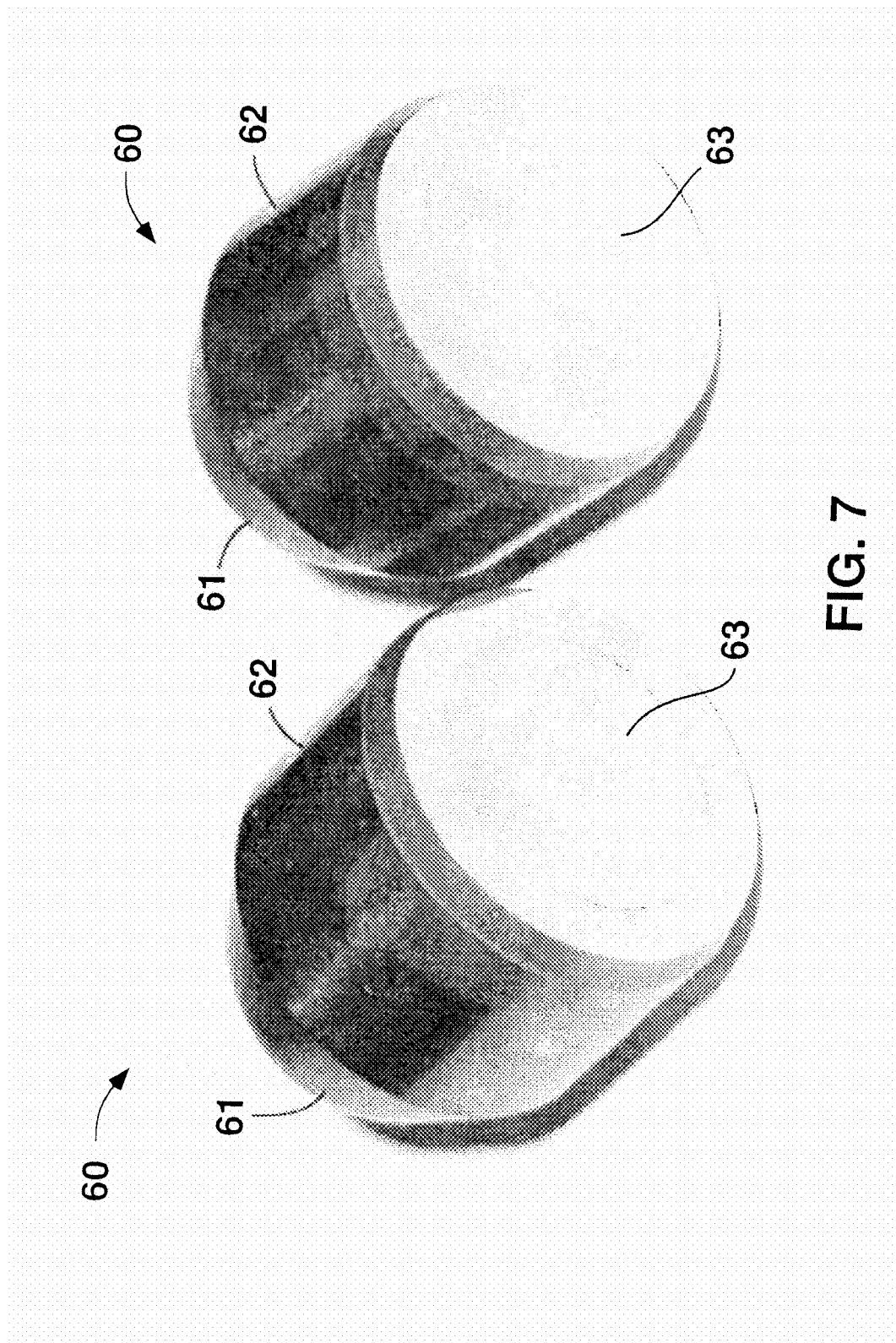
FIG. 7 is a photograph of two cemented carbide cutting inserts for earth boring bits with plugs of a heat sink material visible within a cemented carbide working portion.

Embodiments of the present invention include articles comprising cemented carbide hard particles with increased thermal cracking resistance, including earth boring drill bits, cutting tools, cutting inserts, seal rings, and rolling mill rolls, as well as other articles subject to heat and/or thermal cycling. Certain embodiments of the articles of the present invention comprise a cutting portion and a heat sink portion. The cutting portion comprises cemented carbide. The heat sink portion comprises a material with a thermal conductivity greater than the thermal conductivity of the cemented carbide. Of course, embodiments of the invention include various shapes and sizes of the cutting portion and the heat sink portion and are not limited by the embodiments described herein. For example, the article may be a cutting insert for an earth boring bit having the shapes shown in FIGS. 2A-2E which, as noted above, are ovoid (FIG. 2A), ballistic (FIG. 2B), chisel (FIG. 2C), multidome (FIG. 2D), and conical (FIG. 2E). The heat sink portion may be a core region of a body portion of the cutting insert, or may be a body region. See FIG. 5A, for example, which depicts a cross-section of a cutting insert 50 for an earth boring bit according to the present invention including a working portion in the form of a cutting portion 51, and a body portion 52 including heat sink portion 53 embedded therein. Heat sink portion 53 is in thermal communication with cutting portion 51 and conducts heat from the cutting portion 51. FIG. 7 is a photograph of an actual example of a cutting insert 60 for an earth boring having the construction depicted in FIG. 5A. In FIG. 7, inserts 60 include cemented carbide cutting portion 61, cemented carbide body portion 62 supporting cutting portion 61, and copper heat sink portion 63 embedded within body portion 62 in thermal communication with cutting portion 61. Additional portions within cutting inserts according to the present invention may include central axis support portions, bottom portions, transitional portions, or other portions that may enhance the thermal properties of the cutting inserts for earth boring drill bits.

Embodiments of the articles of the present invention comprise a working portion such as, for example, a cutting portion or a contact portion, wherein the working portion comprises cemented carbide, and a body portion, wherein the body portion includes a heat sink portion in contact therewith. The cemented carbide of the working portion comprises hard particles and a binder. The hard particles comprise carbides of at least one transition metal selected from titanium, chromium, vanadium, zirconium, hafnium, tantalum, molybdenum, niobium, and tungsten. The binder of the cemented carbide typically comprises at least one of cobalt, nickel, iron, or alloys of these metals, but may be any metal or alloy capable of binding the hard particles together. The binder may further comprise an alloying agent selected from tungsten, titanium, tantalum, niobium, chromium, molybdenum, boron, carbon, silicon, ruthenium, rhenium, manganese, aluminum, and copper. In one embodiment, the hard particles of the cemented carbide comprise tungsten carbide having an average grain size of 0.3 to 10 µm, and the binder of the cemented carbide comprises cobalt. To provide the desired properties for certain applications, the cemented carbide may comprise 2 to 40 weight percent of the binder and 60 to 98 weight percent of a transition metal carbide. In certain embodiments, the cemented carbide may comprise tungsten carbide particles having an average grain size of 0.5 to 10 µm.

The heat sink portion is in thermal communication with the working portion and conducts heat away from the working portion to reduce heat build up within the working portion. As noted above, that the heat sink portion is in "thermal communication" with the working portion means that heat may flow from the working portion to the heat sink portion. As such, although in certain embodiments of the articles of the invention the heat sink portion contacts the working portion, it is not necessarily the case that the heat sink portion and working portion are in contact. Instead, a suitably thermally conductive material may be interposed between the working portion and the heat sink portion so that heat flows from the working portion to the heat sink portion. For example, in certain embodiments a region of the body portion of the article may be interposed between the working portion and the heat sink portion. Those with ordinary skill will readily comprehend other designs for the articles according to the present invention allowing for the requisite thermal communication between the working portion and the heat sink portion, and all such embodiments are within the scope of the present invention.

The heat sink portion includes a heat sink material that may be any material with a thermal conductivity greater than the thermal conductivity of the cemented carbide of the working portion. Preferably, the heat sink material has a thermal conductivity greater than twice the thermal conductivity of the cemented carbide of the working portion. For example, the heat sink material may have a thermal conductivity of greater than 150 W/mK, or even greater than 250 W/mK. In certain high friction applications, the heat sink material may have a thermal conductivity of greater than 350 W/mK. Examples of heat sink materials include, but are not limited to, copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, and combinations thereof. Further, the heat sink material may include graphite and other forms of carbon. Preferably, the heat sink portion is large enough to conduct heat from the working portion at a rate sufficient to prevent the working portion from reaching the threshold temperature for crack initiation.

Figure 5A:
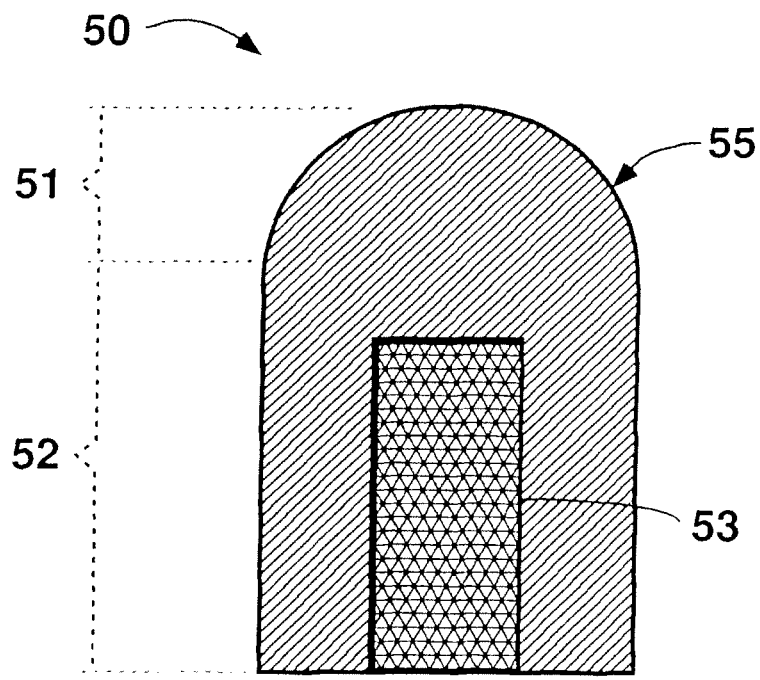
FIGS. 5A-5J are schematic representations of articles comprising cemented carbide and a heat sink.

FIGS. 5A-5J illustrate embodiments of articles of the present invention. It will be understood that these figures necessarily illustrate only a limited number of possible embodiments intended to illustrate various concepts disclosed herein. As discussed above, FIG. 5A illustrates a cross-section of an embodiment of a cutting insert for an earth boring bit 50 of the present invention. The cross-section of the cutting insert 50 of FIG. 5A shows a cutting portion 51 and a body portion 52. The cutting portion 51 of the cutting insert 50 comprises a cemented tungsten carbide material and is adapted to cut through rock and earth during drilling operations. The body portion 52 comprises a heat sink portion 53 forming a core region. The heat sink portion 53 is in thermal communication with and conducts heat from the cutting portion 51 to reduce temperature buildup in the cutting portion 51, thereby reducing the incidence of thermal crack initiation and propagation. In certain embodiments, the heat sink portion may comprise the entire body portion. In other embodiments, the heat sink portion may be in contact with but constitute a separate portion of the article. For example, as shown in FIGS. 5A and 7, the heat sink portion may be disposed in a recess in the body portion.

Figure 5B:
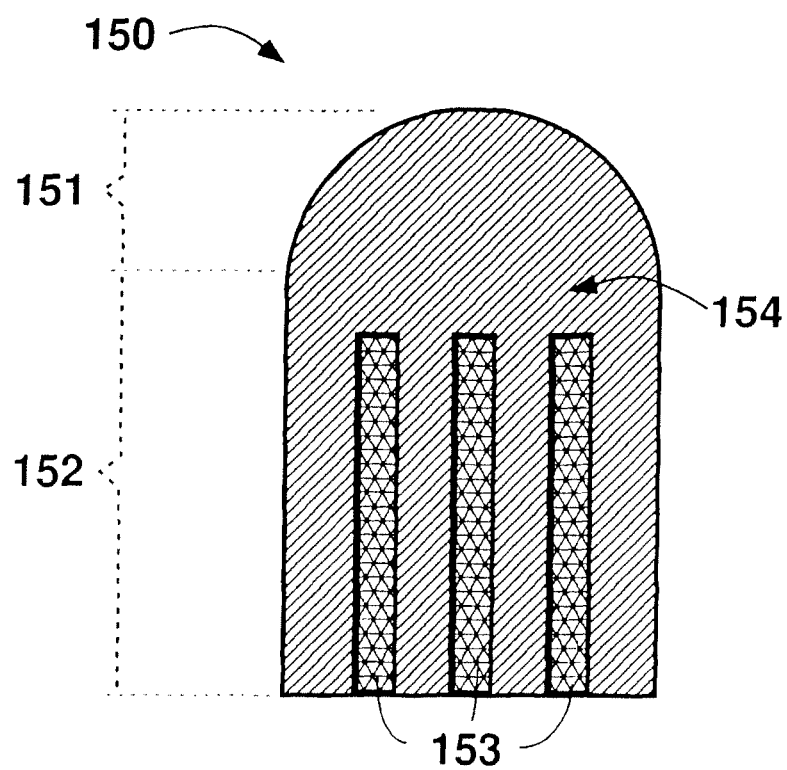

FIG. 5B is a cross-section of another embodiment of a cutting insert 150 for an earth boring bit wherein a heat sink portion is disposed in a recess in a body portion of the article. In particular, cutting insert 150 includes a working portion in the form of a cutting portion 151, and a body portion 152. The body portion 152 includes multiple recesses in which multiple heat sink portions 153 are disposed. A region 154 of the body portion is intermediate the heat sink portions 153 heat sink and the cutting portion 151 and provides for thermal communication between the cutting portion 151 and the heat sink portions 153. The heat sink portions 153 may be designed in any manner capable of increasing the bulk thermal conductivity of the article.

Figure 5C:
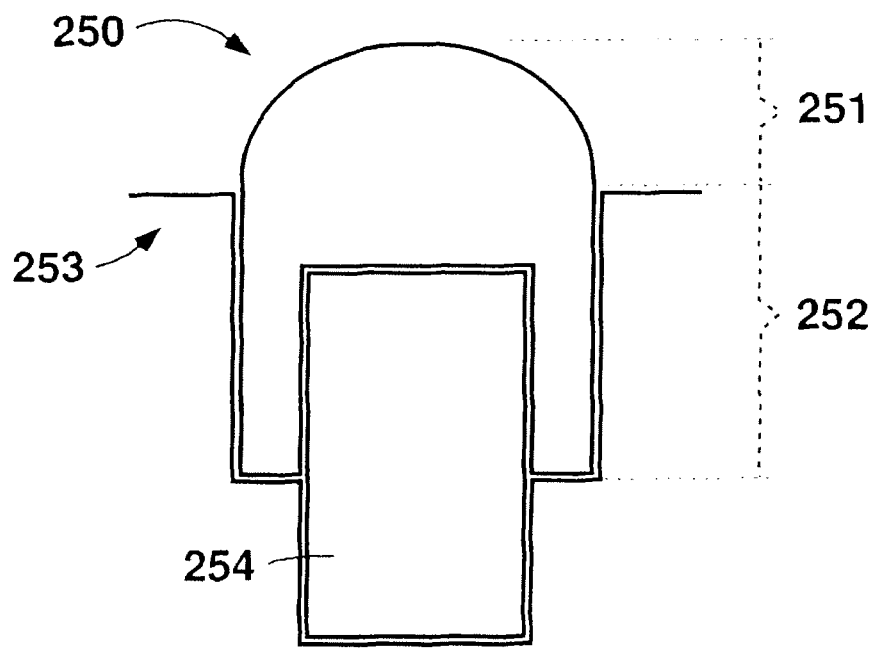
Figure 5D:
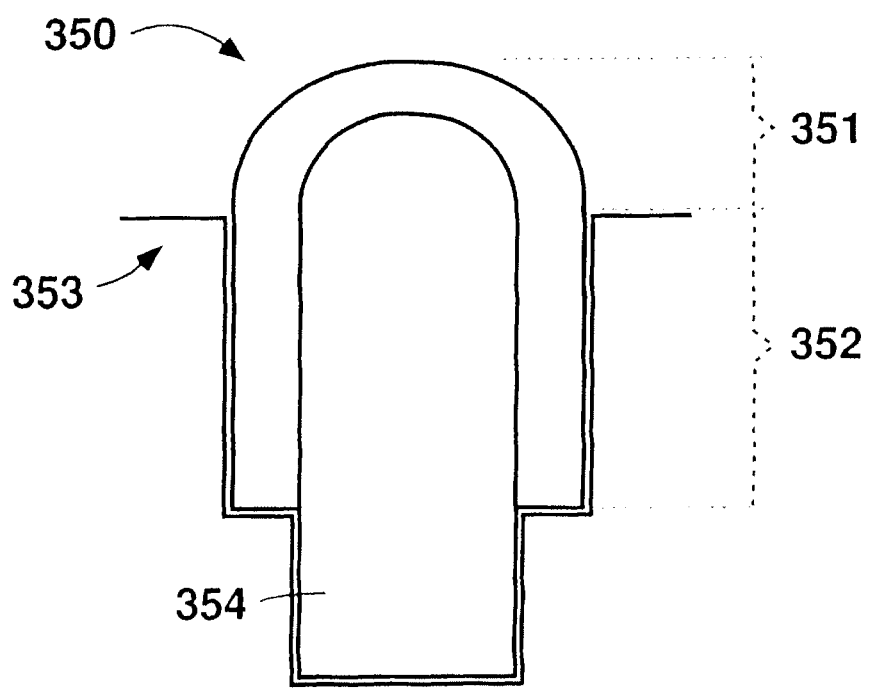
Figure 5E:
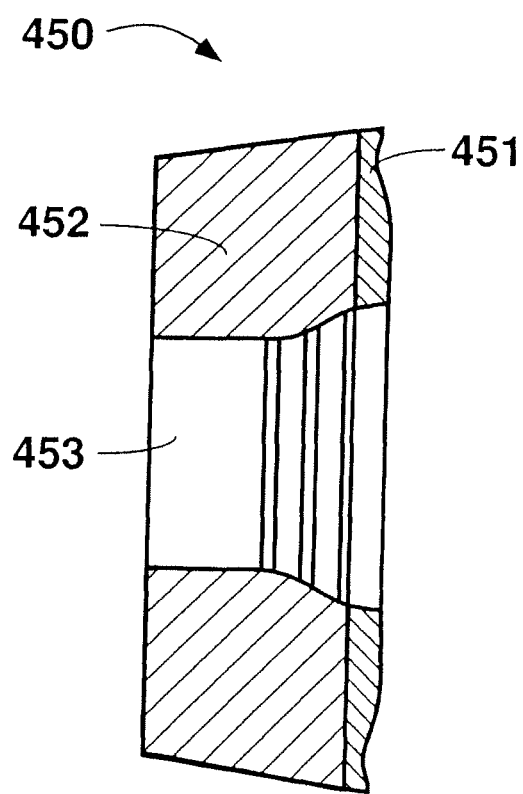

In certain embodiments, a cutting insert for an earth boring bit constructed according to the invention may comprise a heat sink portion that extends into the bit body. For example, FIGS. 5C and 5D show cross-sections of embodiments of cutting inserts for an earth boring bits wherein the cutting inserts 250,350 comprise working portions in the form of cutting portions 251,351 and body portions 252,352. Each body portion 252,352 includes a recess therein for receiving a heat sink portion 254,354. The recess of cutting insert 250 extends through the body portion 252 and into the working portion 251. The body portions 252,352 may be press fit into a recess in the bit body or roller cone 253,353. The heat sink portions 254,354 may press fit into the recess in the body portions 252,353 of cutting inserts 250,350 and also into the recess in the bit body or roller cone 253,353. In this way, the heat sink portions 254,354 directly conduct heat from the articles to the bit body FIG. 5E is an embodiment of a cutting insert 450 for metal working according the present invention. The cutting insert 450 comprises a working portion in the form of a cemented transition metal carbide cutting portion 451 for removing material from a work piece and a heat sink portion 452 for conducting heat away for the cutting portion and raising the bulk thermal conductivity of the article. Accordingly, the heat sink portion 452 of insert 450 also functions as a body portion that supports the cutting portion 451, and the heat sink portion 452 directly contacts the cutting portion 451. A central hole 453 is typically, but not always, included in the cutting insert 450 to allow attachment to a tool holder by a screw. Certain embodiments of inserts that may benefit from the invention may be attached to the tool holder by a clamp. The cutting insert 450 may be adapted for milling, turning, drilling, or other cutting operations.

Figure 5F:
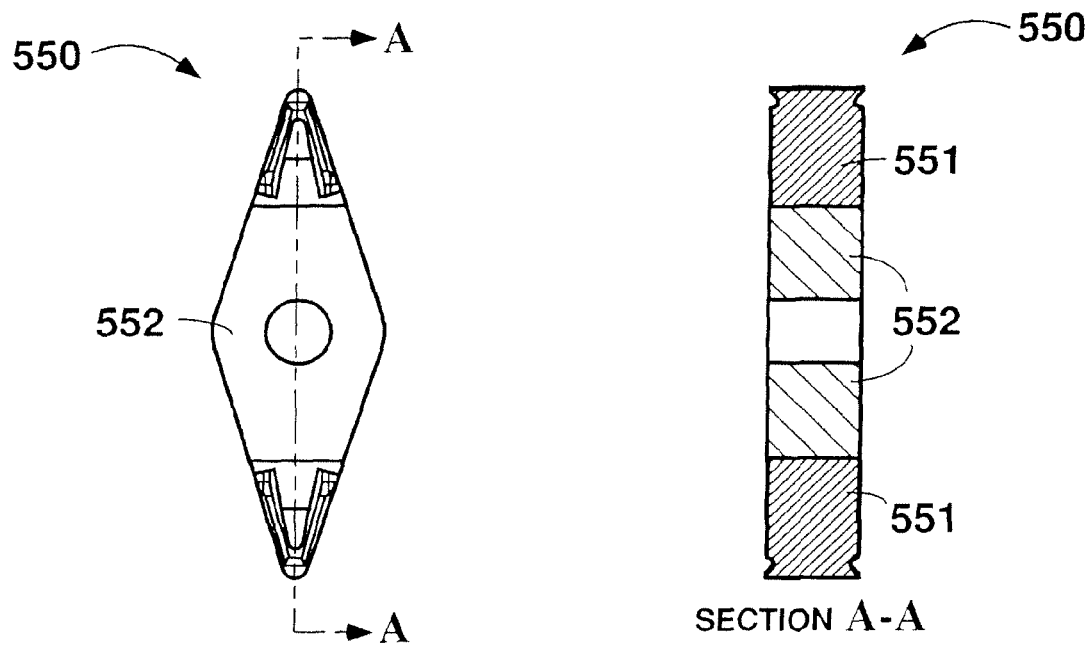

FIG. 5F includes a plan view and a cross-section view (taken through A-A) of an embodiment of a diamond-shaped cutting insert 550 constructed according to the present invention. The cutting insert 550 is indexable, with four cutting edges. Cutting insert 550 includes working portions in the form of cutting portions 551 and a body portion 552 comprising a heat sink material. As such, the body portion 552 also constitutes a heat sink portion that conducts heat from the cutting portions 551. In the embodiment of cutting insert 550, the cutting portion 551 is comprised only of cemented transition metal carbide material, and the heat sink material has a thermal conductivity that is greater than the thermal conductivity of the cemented carbide material.

Figure 5G:
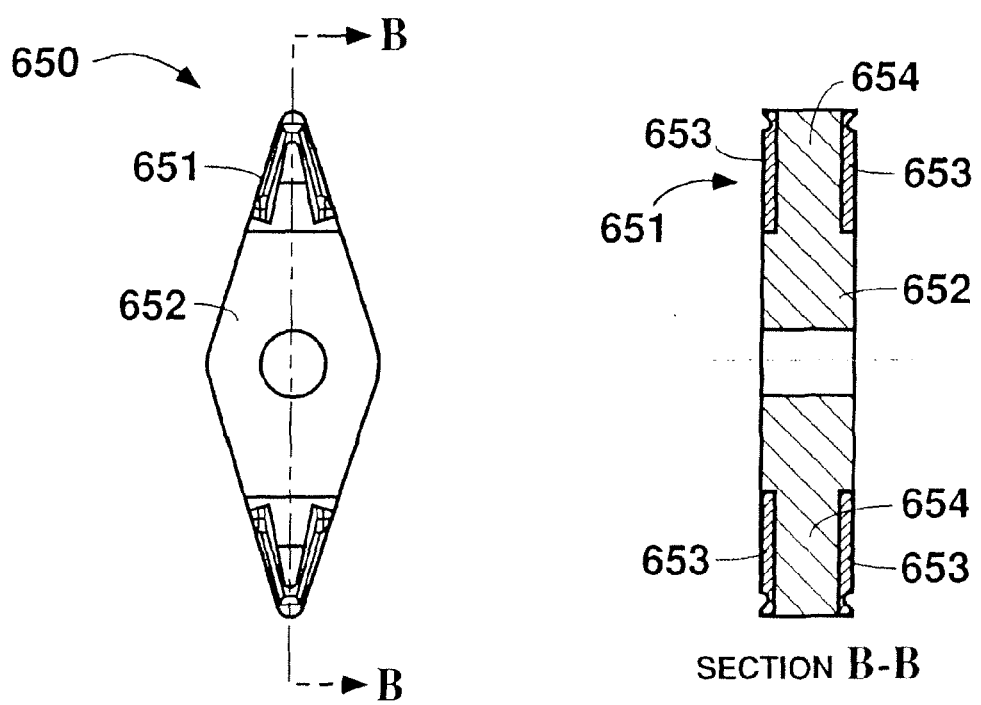

FIG. 5G includes a plan view and a cross-section view (taken through B-B) of another embodiment of a diamond-shaped cutting insert 650 constructed according to the present invention. Cutting insert 650 shown is similar to cutting insert 550 in that both cutting inserts are indexable diamond-shaped cutting inserts for metal working. Insert 650 comprises working portions in the form of cutting portions 651, and a body portion 652. Differences between inserts 550 and 650 may be seen by comparing section A-A of FIG. 5F and section B-B of FIG. 5G. As may be seen in section B-B, the cutting portion 651 comprises a region of cemented transition metal carbide 653. A region 654 of heat sink material underlies the cemented carbide regions 653 on each end of the insert 650. In such an embodiment, the regions 654 may be considered heat sink portions or, alternatively, the regions 654 may be considered to be regions of the body portion 652. In either case, the heat sink material regions 654 conduct heat from the cutting portions 653. Such an embodiment provides a significant amount of heat sink material in the cutting insert.

Figure 5H:
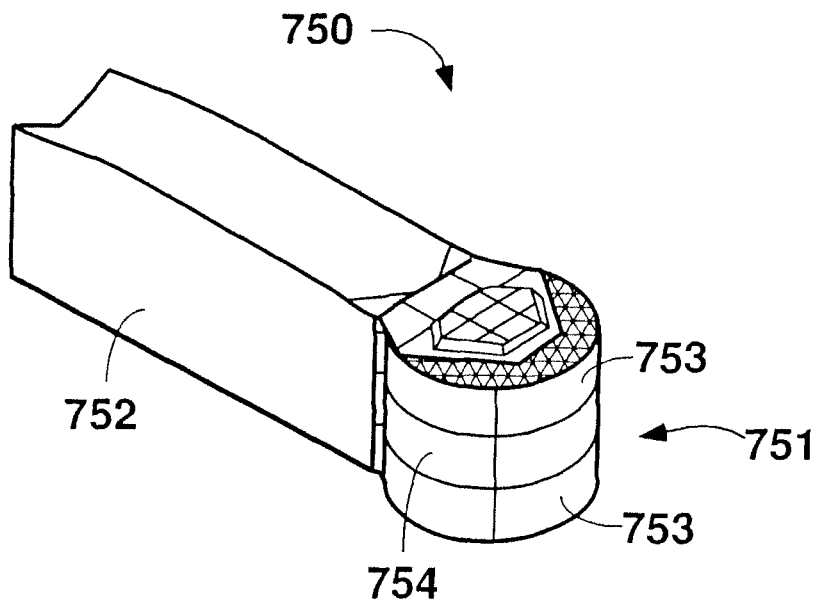

Embodiments of articles according to the present invention also include cutting tools. An embodiment of a cutting tool 750 is shown in FIG. 5H. Cutting tool includes a working portion in the form of cutting portion 751, and a body portion 752. The cutting portion 751 comprises two cemented transition metal carbide regions 753. A heat sink material region 754 is interposed between and conducts heat from the cutting regions 753. The heat sink material has a thermal conductivity that is greater than the thermal conductivity of the cemented carbide. In one embodiment, the heat sink region 754 contacts the body portion 752, which also may be formed of a heat sink material having a thermal conductivity greater than the cemented carbide material of regions 753. Alternatively, the heat sink region 754 is integral with and forms a part of the body portion 752, which is formed of a single heat sink material.

Figure 5I:
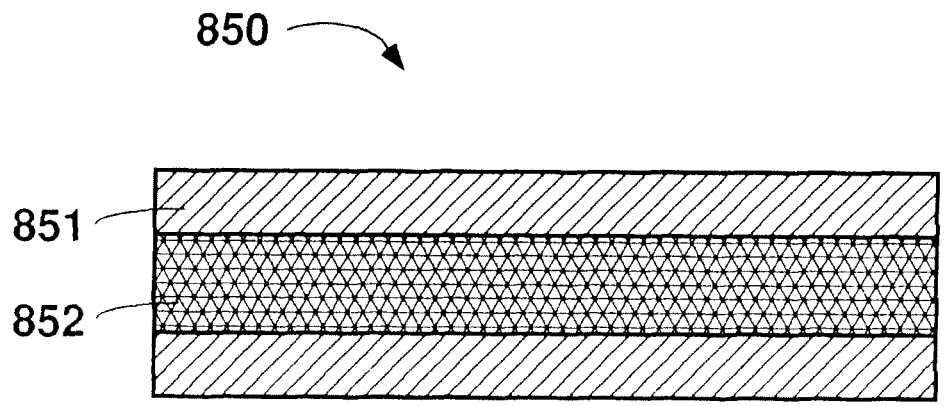
Figure 5J:
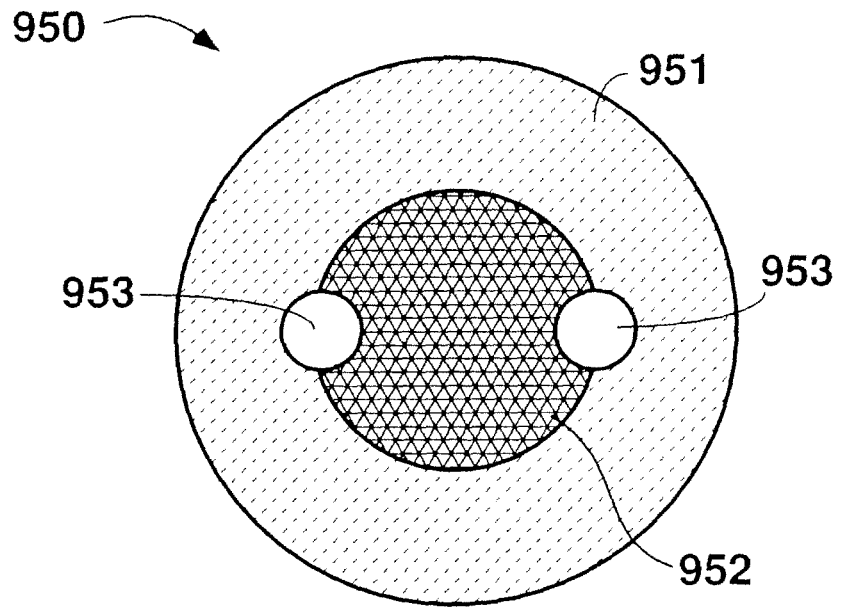

Further embodiments of articles constructed according to the present invention are shown in the cross sections of FIGS. 5I and 5J. The embodiment shown in the longitudinal cross section of FIG. 5I is a rod 850 comprising a working portion in the form of an outer or contact portion 851 and an inner or core region 852. Such an embodiment may be used as blanks for rotary tools, for example, blanks for drill bits and end mills. The inner or core region may comprise a heat sink portion. The heat sink portion may be only a section of the core region, or, the entire core region may be the heat sink portion. The contact portion 851 include cemented carbide, and heat sink portion may include a heat sink material having a thermal conductivity that is greater than a thermal conductivity of the cemented carbide. Cutting features may be formed on the outer or contact portion. In addition, cutting features may be formed on an end of the rod. When in use, the contact region 851 becomes hot, and heat is conducted from the contact region 851 by the heat sink portion 852.

FIG. 5J also shows a rod embodiment constructed according to the present invention. The cross section shown in FIG. 5J is taken at a right angle through the longitudinal axis of rod 950. Rod 950 comprises a working portion in the form of an outer or contact region 951 and an inner or core region 952. As in the embodiment of FIG. 5I, all or a portion of the core region 952 is a heat sink portion comprising a heat sink material. Rod 950, however, also includes longitudinally extending coolant channels 953 in which a coolant may be circulated to further conduct heat from the contact portion 851 and the core region 952. Such an embodiment may be used for drill bits, milling bits, or other rotary tools. It will be understood that although FIGS. 5I and 5J depict rods, the same principles of construction may be applied to finished tools that may be constructed using the rods as blanks. As suggested herein, such tools include, for example, drill bits and certain rotary tools.

Embodiments of the present invention also include an earth boring bit comprising a bit body or roller cone, a heat sink, and a cutting insert in contact with the heat sink, wherein the cutting insert is fastened to the bit body or the roller cone. The heat sink may also be in contact with the bit body. Preferably, the heat sink is embedded, integral to, or is disposed in a recess in at least one of the cutting insert or the bit body or roller cone. Further, the cutting insert may be fastened in a pocket of the bit body or roller by brazing, adhesive bonding, friction fit, or other mechanical affixation, as well as other means.

Figure 8:
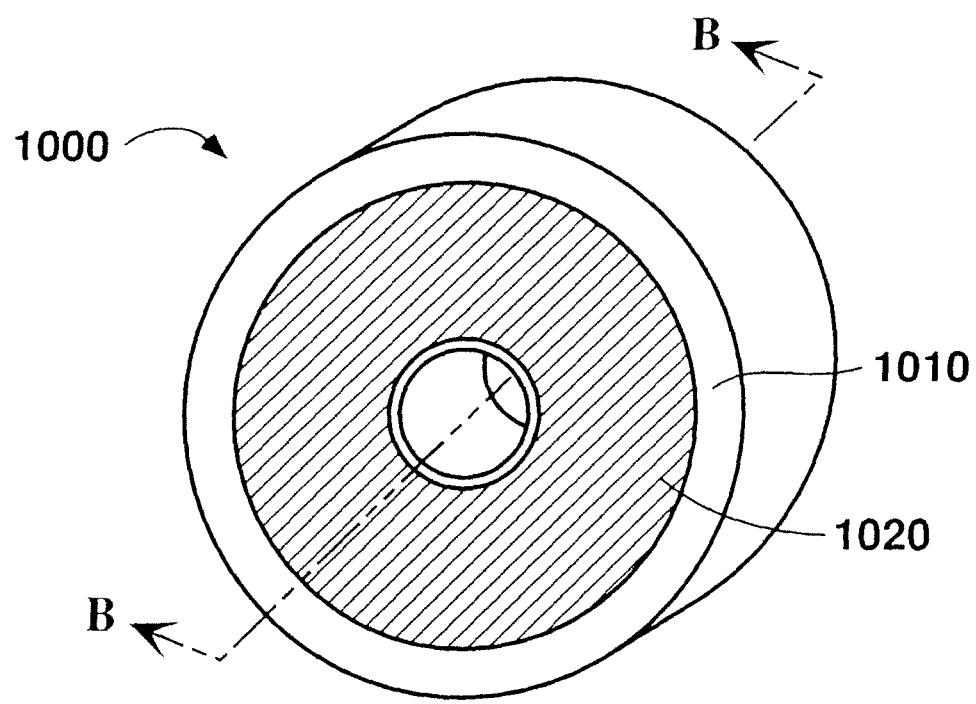
FIGS. 8A and 8B are schematic representations of an embodiment of a seal ring according to the present invention including a working portion comprising cemented carbide and a heat sink portion in thermal communication with the working portion.
Figure 8:
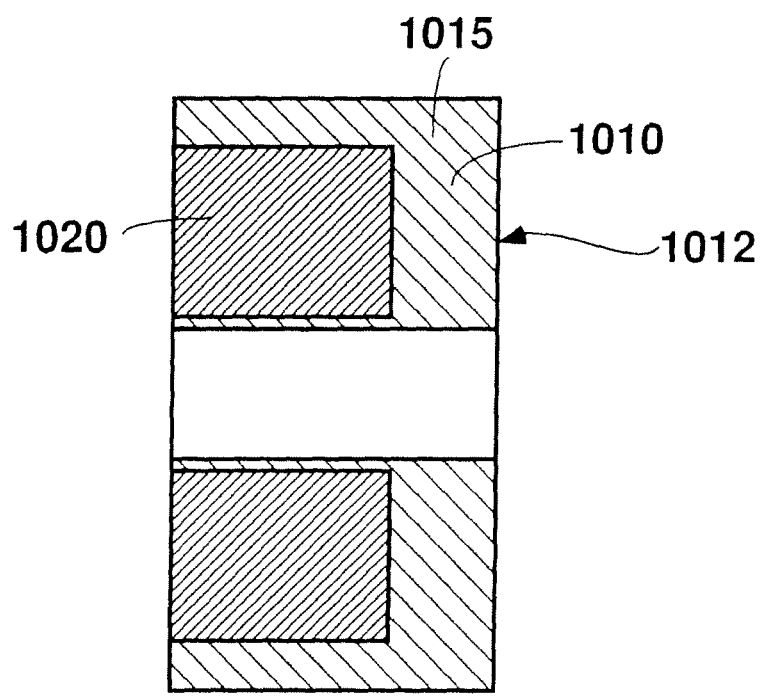

Certain additional embodiments of articles according to the present invention include seal rings such as seal ring 1000 shown in perspective FIG. 8A and in cross-section along line B-B in FIG. 8B. Seal rings are commonly found in equipment such as pumps and compressors and provide a mechanical seal around a shaft or other moving part. Seal ring 1000 includes a working portion in the form of an annular contact portion 1010, a heat sink portion 1020, and a body portion 1015 at least partially intermediate the contact portion 1010 and the heat sink portion 1020. The contact portion may comprise cemented carbide and may include a contact surface 1012 that contacts and applies a force to one or more parts of an apparatus to provide a mechanical seal. As contact is made at the contact surface 1012, friction generates heat at the contact surface 1012. The heat sink portion 1020 conducts heat away from the contact portion 1010 to reduce heat buildup at the contact surface 1012. The heat sink portion 1020 includes a heat sink material having a thermal conductivity greater than the thermal conductivity of the cemented carbide of the contact portion 1010, and is in thermal communication with the contact portion.

Figure 9:
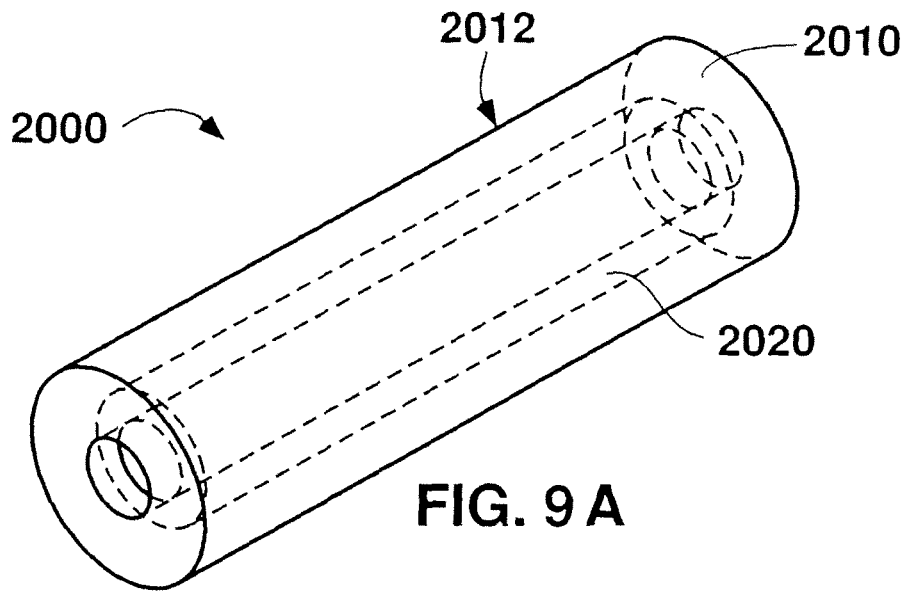
FIGS. 9A-9C are schematic representations of an embodiment of a rolling mill roll according to the present invention including an annular working portion comprising cemented carbide and heat sink portion in thermal communication with the working portion.
Figure 9:
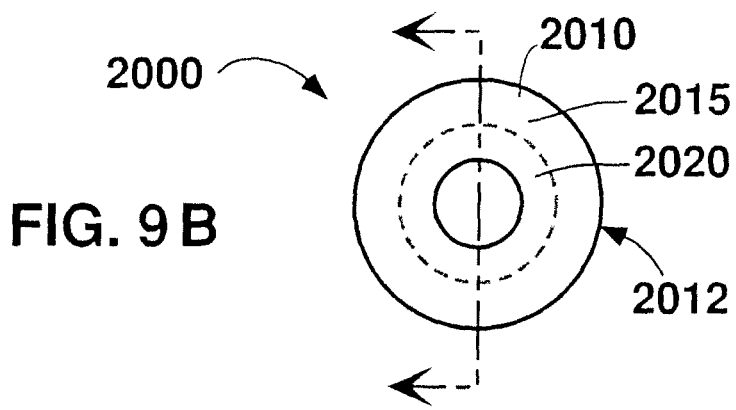
Figure 9:
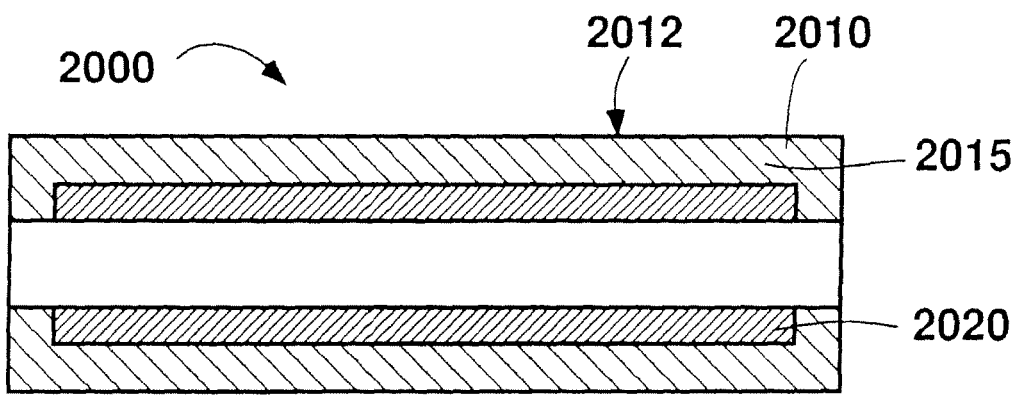

Certain other embodiments of articles according to the present invention include rolling mill rolls such as roll 2000 shown in FIG. 9A through. FIG. 9A is a schematic perspective view showing certain interior features in dotted lines. FIG. 9B is a cross-section taken through the midway point of roll 2000 at a right angle to the roll's longitudinal axis. FIG. 9C is a cross-sectional view taken through the longitudinal axis of roll 2000. Rolling mill rolls are commonly used to work metal and metallic alloy workpieces and may be adapted to reduce a thickness of or otherwise modify the shape of such workpieces. Roll 2000 includes a contact portion 2010, at least one heat sink portion 2020, and a body portion intermediate the contact portion 2010 and the heat sink portion 2020. The contact portion 2010, as well as the body portion 2015, may comprise cemented carbide as described elsewhere herein. The contact portion 20101 also may comprise a contact surface 2012. As the rolling mill roll 2000 rotates, contact with the workpiece results in friction that heats the contact surface 2012. In addition, the workpiece itself may have been heated to high temperature before it is worked by the roll 2000. The heat sink portion 2020 includes a heat sink material, which is may be any suitable material with a thermal conductivity greater than the thermal conductivity of the cemented carbide of the contact portion 2010. The heat sink portion 2020 conducts heat from the contact portion 2010 to reduce heat buildup at the contact surface 2012, and is in thermal communication with the contact portion.

Figure 3:
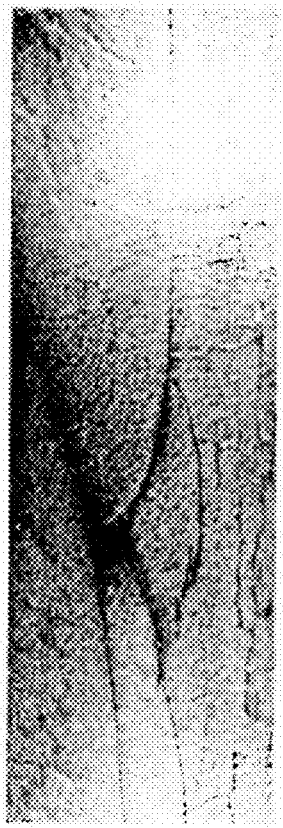
FIG. 3 is a photomicrograph of cracks caused by thermal fatigue in a cemented carbide material.

Cemented carbides offer very attractive combinations of strength, abrasion and erosion resistance, as well as fracture toughness. Cemented carbides do, however, have limited thermal fatigue and shock resistance. When subjected to thermal fatigue and shock (high temperatures with repeated heating and quenching), cemented carbides often exhibit surface cracking. FIG. 3 shows a typical cemented carbide with surface cracks resulting from thermal fatigue. Once cracks are initiated in a cemented carbide, the cracks continue to grow as the inserts are subjected to continued thermal cycling. Ultimately, numerous cracks will intersect and pieces of the cemented carbide insert may break away from the bulk material (often referred to as spalling).

For example, cutting inserts for earth boring bits are subject to a great deal of rubbing action against the rock being cut during earth boring operations. The friction resulting from the rubbing action causes a substantial temperature increase at the cutting surface of the inserts. Further, the cutting inserts are also subject to quenching by the coolant (mud) during the boring operation. They are thus subject to intense thermal cycling by the constant heating and cooling. In many instances, premature thermal cracking by thermal fatigue is the primary factor limiting the life of cemented carbide inserts employed in earth boring bits. Other examples of articles subject to thermal cycling and thermal fatigue include cutting inserts for milling, drilling, or boring, seal rings, and rolling mill rolls.

Figure 4:
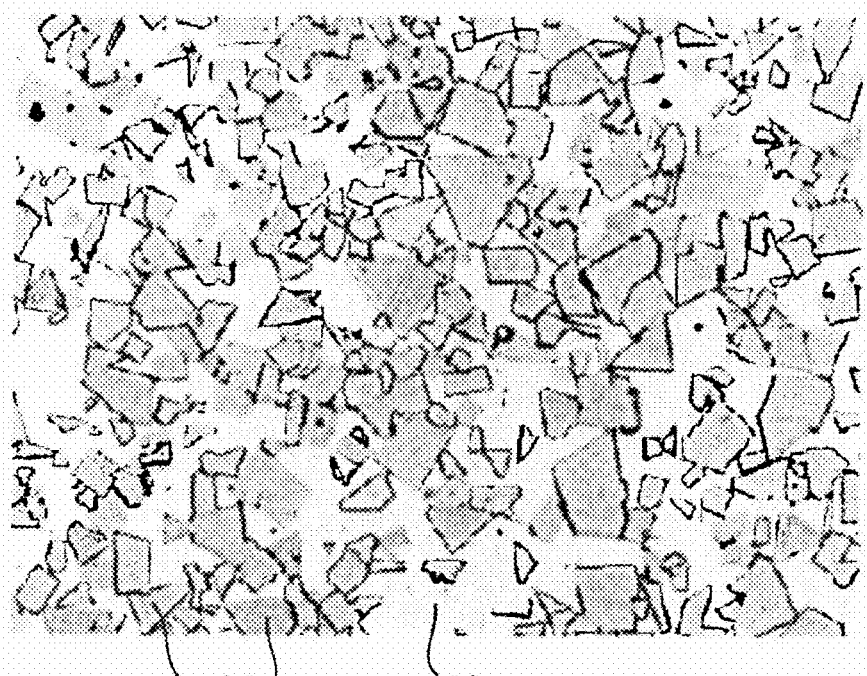
FIG. 4 shows the typical microstructure of a cemented hard particle material having a continuous binder phase and a discontinuous hard particle phase.

The relatively limited thermal cracking resistance of cemented carbides may be related to the fact that the materials are composites comprising two phases with different thermal expansion properties. FIG. 4 illustrates a typical microstructure of a cemented carbide. As can be seen in FIG. 4, the microstructure consists of grains of a hard discontinuous phase 41 dispersed within a continuous matrix of a binder phase 42. The coefficient of thermal expansion (CTE) of the hard discontinuous phase 41, is greatly different than the CTE of the binder phase 42. For example, the CTE of cobalt, a typical binder for cemented carbides, is approximately 3 times greater than the CTE of tungsten carbide (WC), a typical hard particle in cemented carbides ($12 \times 10^{-6}$ cm/cm/° C. for cobalt versus $4 \times 10^{-6}$ cm/cm/° C. for WC). As the temperature of a cemented carbide rises, the cobalt expands at a much faster rate than the WC. As a result, large stresses occur at the interfaces between the two phases. The magnitudes of the stresses are directly related to the extent of the temperature increase. Furthermore, as the cemented carbide is subjected to thermal cycling (repeated heating and quenching), the interface weakens sufficiently to allow cracks to initiate. With continued thermal cycling the cracks can grow until spalling occurs.

There is thus a great need for approaches to improve the thermal cracking resistance of cemented carbides and other cemented hard particle materials, but without sacrificing their inherent strength, abrasion, erosion resistance, and fracture toughness.

In general, the thermal cracking resistance of any cemented carbide is directly proportional to its thermal conductivity (TC) as well as fracture toughness (Klc), and inversely proportional to its coefficient of thermal expansion (CTE) and Young's modulus (E). Thus, thermal cracking resistance may be improved by increasing the bulk thermal conductivity and/or fracture toughness, and by decreasing bulk thermal expansion and/or stiffness (Young's modulus). Increased TC prevents localized hot spots, while reduced thermal conductivity reduces the stresses at the phase interfaces. Cemented carbide materials having improved thermal cracking resistance can be expected to operate at higher temperatures and for a larger number of thermal cycles before thermal cracks initiate and grow.

The thermal conductivity, fracture toughness, thermal expansion and Young's modulus of a cemented carbide may be altered by varying chemical composition and/or microstructure. For example, bulk or local fracture toughness can be altered by varying the hard particle grain size and/or binder content. Unfortunately, an increase in fracture toughness (desirable from a thermal cracking resistance point of view) may be detrimental from a performance standpoint since an increase in hard particle grain size and/or binder content will invariably result in a decrease in abrasion and erosion resistance.

Similarly, thermal conductivity can be increased by increasing the hard particle content of a cemented carbide material. However, an increase in hard particle concentration will invariably result in a decrease in fracture toughness. Also, the coefficient of thermal expansion can be decreased by changing the composition of the binder or decreasing binder content. In either case, fracture toughness is reduced. Finally, the Young's modulus may be decreased by decreasing hard particle content. However, decreasing the hard particle content will result in a decrease in abrasion and erosion resistance. Therefore, attempts to improve thermal cracking resistance by altering thermal conductivity, fracture toughness, thermal expansion, and Young's modulus using conventional methods may also result in diminished performance through either a decrease in fracture toughness or abrasion and erosion resistance.

Certain embodiments of the present invention are directed to a novel method of improving the effective thermal conductivity in cemented carbide earth boring inserts without altering the chemical makeup or microstructure of the cutting (working) portion of the inserts. In this manner, the inherent fracture toughness, strength, and abrasion/erosion resistance of the insert is not altered, while the overall thermal conductivity (and hence, thermal cracking resistance) is substantially improved.

In one embodiment, the cutting insert is comprised of a working portion in the form of a cutting portion with a cemented transition metal carbide chemical composition (e.g., binder and/or hard particle identity and/or content) and microstructure (e.g., hard particle grain size) optimized for the intended application (e.g., type of rock being cut, desired cutting speed), as well as a heat sink portion that has a substantially higher thermal conductivity compared to the cutting portion. During the cutting operation, the heat sink portion conducts heat generated at the cutting surface of the cutting portion away from the cutting surface. In this manner, the temperature increase at the cutting portion is reduced relative to a conventionally designed article, and the propensity for thermal crack initiation is reduced.

FIG. 5A illustrates one embodiment of a cutting insert 50 comprising a heat sink. The insert 50 includes a dome-shaped cutting portion 51 having a cutting surface 55, and body portion 52. Both the cutting portion 51 and the body portion 52 comprise cemented transition metal carbide. Heat sink portion 53 is disposed within body region 52 and includes a heat sink material. Possible heat sink materials include highly thermally conductive metals such as, for example, Cu, Al, Ag, or Au. In certain embodiments, the cemented carbide may be a grade having thermal conductivity (TC) in the range of 90 W/mK up to 105 W/mK. In such embodiments, the TC of the heat sink material would be greater. For example, Cu has a TC of approximately 401 W/mK, Al has a TC of approximately 373 W/mK, Ag has a TC of approximately 429 W/mK, and Au has a TC of approximately 317 W/mK. Alternatively, for example, the heat sink portion could comprise graphite, which has a thermal conductivity up to 450 W/mK, depending upon grade. Clearly, the bulk thermal conductivity of the cemented transition metal carbide insert 50 can be greatly increased by incorporating a highly conductive core region as shown in FIG. 5A. The presence of the conductive core (heat sink portion 53) can be expected to rapidly conduct heat from the cutting surface 55, thus inhibiting build-up of heat and initiation of thermal cracks. The improvement in thermal conductivity may be obtained with no sacrifice in fracture toughness or abrasion/erosion resistance in the cutting portion 51. Other embodiments of articles according to the present invention, for example, other cutting inserts, tools, rolling mill rolls, and seal rings, may benefit in a similar manner from the design principles described herein.

Cutting inserts according to a first example can be made by first fabricating an insert with a central blind hole or recess in a body portion of the insert and disposing a thermally conductive metal or metallic alloy heat sink material in the recess to provide a heat sink portion. In certain embodiments, the thermally conductive heat sink material may be disposed in the recess in the body portion by heating the material to melt the material, and then pouring the molten material into the recess and allowing the material to cool to a solid form. Alternatively, the heat sink material may be disposed in the recess as a solid plug, or may be disposed in the recess as a powder. A solid heat sink material may be secured in the recess (i.e., mechanically attached) by shrink fitting and/or press fitting. In addition, a thermally conductive metal or metallic alloy in powder form could be placed in the recess and then tamped in place so as to densely pack and thereby mechanically attach the heat sink material in the recess. FIG.

5A, discussed above, schematically depicts an embodiment that may be made by disposing a molten or powdered heat sink material in a recess in a base portion of the insert. Also, subsequent to adding the powdered heat sink material to the recess, a solid plug may be press fit or otherwise mechanically attached in the recess, such that the powdered heat sink material is mechanically attached within a void in the body portion. The solid plug may also comprise a heat sink material such that the solid plug and the powder secured within the void in the body portion by the solid plug constitute the heat sink portion. Securing the solid plug in the recess also may act to further tamp or compact the powdered heat sink material in the recess, which may improve the thermal conductivity of the powder and, more generally, the heat sink portion. In an alternative design shown in FIG. 5B, a cutting insert according to the present invention may comprise more than one heat sink portion disposed in a body portion of the insert.

Figure 6:
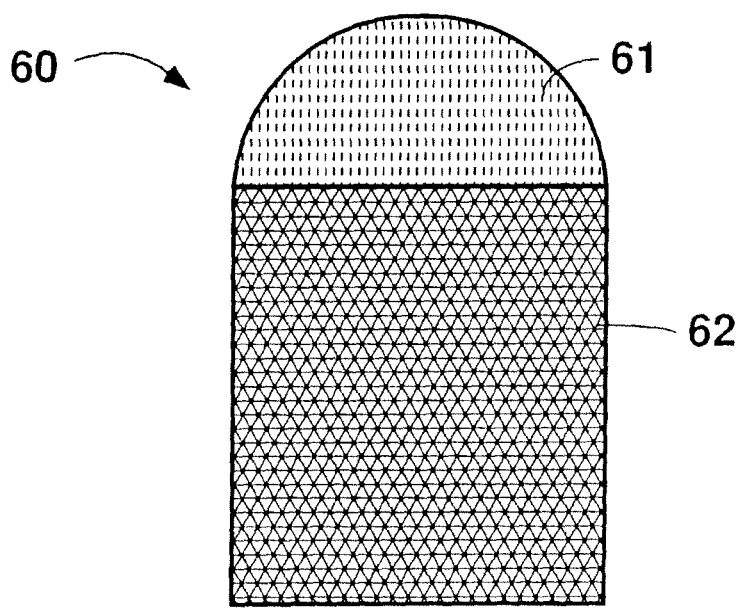
FIG. 6 is a schematic representation of a cutting insert of the present invention comprising a cemented carbide infiltrated with a conductive material.

FIG. 6 illustrates another embodiment of a cutting insert for an earth boring bit according to the present invention. The cutting insert 60 comprises a dome-shaped cutting portion 61 and a base or body portion 62. While the cutting portion 61 consists of a conventional fully-dense cemented carbide material, the base portion 62 consists of a cemented carbide with interconnected porosity. The porosity in the base region is infiltrated with a heat sink material that may be a highly thermally conductive metal or metallic alloy. As discussed herein, a suitable thermally conductive metal or metallic alloy any such material with a thermal conductivity greater than that of the cemented carbide. Examples of suitable heat sink materials include, but are not limited to, copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, and combinations thereof. The base portion 62 can be expected to have a significantly higher thermal conductivity than the cutting portion 61, and hence, will act as heat sink similar to the centrally-disposed heat sink portion in the embodiment depicted in FIG. 5A, discussed above. In the body portion of such an embodiment, the hard particles of the cemented carbide form a dispersed first phase. The binder of the cemented carbide forms a first continuous phase, wherein the hard particles are dispersed within the first continuous phase. The heat sink portion forms a second continuous phase.

Methods of making an article with an infiltrated heat sink portion are described herein. A portion of a mold may be filled with a cemented carbide powder blend including a fugitive material. A fugitive material is a relatively low melting point material included in powder metal blends and which is removed from the powder compact by heating, thereby providing interconnected porosity in the compact or sintered material. Fugitive materials are known in the powder metal art and include, but are not limited to, wax particles and particulate polymers such as polyethylene and polypropylene. The powder blend may be consolidated, forming a green compact, and the green compact is subsequently sintered. During the sintering process (or during some other heating process before sintering), the fugitive material is removed by one of melting, burning, and evaporation, thereby providing a series of interconnected voids. The interconnected porosity is infiltrated with a heat sink material by any infiltration method known in the art. For example, the article can be submerged in a molten bath of heat sink material. In the alternative, the article may be contacted with a mass of the heat sink material and heated to a temperature above the melting temperature of the heat sink material.

Alternative embodiments of articles including an heat sink material infiltrated into interconnected porosity may be formed by first filling a portion of a mold with a first cemented carbide powder. At least portion of the remainder of the void is filled with a second cemented carbide powder comprising a fugitive material. The powders are consolidated in the mold to form a unitary green body with two regions. The green body is sintered, thereby removing the fugitive material and resulting in a cemented carbide article having a first region of substantially fully dense cemented carbide and a second region of cemented carbide including interconnected porosity. The second region is infiltrated with a heat sink material.

Any of the articles constructed according to the present invention may comprise hybrid cemented carbides in, for example, the working portion and/or the body portion. For example, embodiments of cutting inserts and other articles according to the present invention may comprise hybrid cemented carbides, such as, but not limited to, the hybrid cemented carbides described in co-pending U.S. patent application Ser. No. 10/735,379, which is hereby incorporated herein by reference. Generally, hybrid cemented carbide is a material comprising particles of at least one cemented carbide grade dispersed throughout a second cemented carbide continuous phase, thereby forming a composite of cemented carbides. The hybrid cemented carbides of U.S. patent application Ser. No. 10/735,379, for example, have low contiguity ratios and improved properties relative to other hybrid cemented carbides. Preferably, the contiguity ratio of the dispersed phase of the hybrid cemented carbide may be less than or equal to 0.48. Also, a hybrid cemented carbide composite of the present invention preferably has a dispersed phase with a hardness greater than the hardness of the continuous phase. For example, in certain embodiments of the hybrid cemented carbides used in one or more portions of cutting inserts and other articles according to the present invention, the hardness of the dispersed phase is preferably greater than or equal to 88 HRA and less than or equal to 95 HRA, and the hardness of the continuous phase is greater than or equal to 78 and less than or equal to 91 HRA.

Additional embodiments of cutting inserts and other articles according to the present invention may include hybrid cemented carbide composites comprising a first cemented carbide dispersed phase and a second cemented carbide continuous phase, wherein the volume fraction of the first cemented dispersed phase is less than 50 volume percent and the contiguity ratio of the dispersed phase is less than or equal to 1.5 times the volume fraction of the dispersed phase in the composite material.

The manufacturing process for articles of cemented carbide typically comprises blending or mixing a powdered metal comprising the hard transition metal carbide particles and a powdered metal comprising the binder to form a powder blend. The powder blend may be consolidated or pressed to form a green compact. The green compact is then sintered to form the article or a portion of the article having a solid monolithic construction. As used herein, an article or a region of an article has a monolithic construction if it is composed of a material, such as, for example, a cemented carbide material, having substantially the same characteristics at any working volume within the article or region. Subsequent to sintering, the article may be appropriately machined to form the desired shape or other features of the particular geometry of the article. For example, the powder blend may be consolidated by mechanically or isostatically compressing the powder blend to form the green compact. The green compact is subsequently sintered to further densify the compact and to form an autogenous bond between the regions or portions of the article. Preferably, the compact is over pressure sintered at a pressure of 300-2000 psi and at a temperature of 1350-1500° C.

Embodiments of the present invention include methods of producing cutting inserts for drilling bits or earth boring bits. Such methods, however, also may be adapted for forming any of the articles according to the present invention, including, for example, cutting tools, rotary tools, rotary tool inserts, drills, knifes, slitters, rolling mill rolls, and seal rings. One such method includes placing a cemented carbide powder blend into a first region of a void of a mold. A solid heat sink material, such as one or more solid pieces of the heat sink material, may be placed into a second region of the void of the mold. Depending on the number of regions of cemented carbide to be included in the cutting insert along with the heat sink material, the mold may be partitioned into additional regions in which additional powders may be disposed. For example, the mold may be segregated into regions by placing one or more physical partitions in the void of the mold to define the several regions, or by merely filling the portions of the mold without providing a partition. The powders are chosen to achieve the desired properties of the corresponding portions of the cutting insert, as described herein. The powders and the solid heat sink material within the mold are then mechanically or isostatically compressed at the same time to densify the powders and heat sink material solids together to form a green compact of consolidated powder and heat sink material. The green compact may then be sintered to densify the consolidated powders originally added to the mold. In embodiments according to the present invention wherein a cemented carbide powder and a heat sink material are heated while in contact with one another so as to sinter the cemented carbide powder, however, the heat sink material must have a melting temperature that is higher than the sintering temperature. In particular, with respect to heat sink materials described herein having melting temperatures less than conventional cemented carbide powder sintering temperatures (for example, copper, aluminum, silver, and gold), these heat sink materials would not wet and form a metallurgical bond with a cemented carbide formed by co-sintering the cemented carbide powder in contact with the powdered heat sink material.

The heat sink material forms or comprises a heat sink portion that contacts or otherwise thermally communicates with the working portion of the insert. The foregoing method of preparing a sintered compact including a heat sink portion provides a cutting insert that may be of any shape and have any other physical geometric features. Particularly advantageous cutting insert shapes and features formed in the methods according to the present invention will be known to those of ordinary skill in the art of manufacturing cutting inserts.

In certain of the methods according to the present invention, the cemented carbide powder is consolidated in the mold to form a green compact, and the green compact is sintered before the heat sink material is added to the article.

In other embodiments, the cemented carbide powder is added to a mold and consolidated to form a first green compact. The heat sink material is subsequently added to the first green compact, and the combined materials are consolidated. The second green compact is subsequently sintered to form the article. The article includes a working portion comprising the cemented carbide formed during sintering of the cemented carbide powder, and a heat sink portion comprising the heat sink material. Considering the nature of the heat sink materials herein, however, a metallurgical bond would not form between the working portion and the heat sink portion during heating.

A further embodiment of the method of the present invention comprises consolidating a cemented carbide in a mold to form a first green compact comprising a recess. The recess may then be filled with a heat sink metal. The first green compact may be sintered before addition of the heat sink material. The first green compact may also be sintered after addition of the heat sink material if the heat sink material is added in solid form and has a melting temperature greater than the sintering temperature. If desired, the first green compact may be presintered up to a temperature of about 1200° C. to provide strength to the green compact prior to addition of the heat sink material. In certain embodiments in which the heat sink material is a solid, the solid may be secured in the recess by shrink-fitting or press-fitting the solid on the recess.

In certain embodiments of a method of making an article according to the present invention, a sintered body is prepared comprising cemented carbide, and a heat sink material is disposed within and mechanically attached to the sintered body. The heat sink material has a thermal conductivity greater than the thermal conductivity of the cemented carbide. The sintered body may comprise a recess, and adding the heat sink material may comprise disposing the heat sink material in the recess. The heat sink material may be a solid, a powder, a liquid, or combinations of any thereof. Solids may be added to a recess by, for example, press fitting or shrink fitting, thereby forming a mechanical bond between the solid heat sink material and the recess. In other embodiments, a powdered heat sink material is disposed in the recess. The powder may be compacted in the recess. Also, in certain embodiments the powder is compacted and secured within the recess by disposing a solid plug in the recess to form a mechanical seal within the recess subsequent to adding the powdered heat sink material.

Such embodiments of the method of the present invention provide the cutting insert designer increased flexibility in design of the different shapes of each portion for particular applications. The green compact may be designed in any desired shape from any desired cemented carbide material.

One skilled in the art would understand the process parameters required for consolidation and sintering to form cemented carbide cutting inserts and other articles. Such parameters may be used in the methods of the present invention. For example, sintering of cemented carbide powders used in forming cutting inserts and other articles according to the present invention may be performed at a temperature suitable to densify the article, such as at temperatures up to 1500° C.

It is to be understood that the present description illustrates those aspects of the invention relevant to a clear understanding of the invention. Certain aspects of the invention that would be apparent to those of ordinary skill in the art and that, therefore, would not facilitate a better understanding of the invention have not been presented in order to simplify the present description. Although embodiments of the present invention have been described, one of ordinary skill in the art will, upon considering the foregoing description, recognize that many modifications and variations of the invention may be employed. All such variations and modifications of the invention are intended to be covered by the foregoing description and the following claims.

What is claimed is:
1. A cutting insert for metal working comprising:
a first cutting portion comprising a cemented carbide including a binder in which are dispersed hard particles of at least one of titanium carbide, chromium carbide, vanadium carbide, zirconium carbide, hafnium carbide, tantalum carbide, molybdenum carbide, niobium carbide, and tungsten carbide;

a second cutting portion comprising a cemented carbide including a binder in which are dispersed hard particles of at least one of titanium carbide, chromium carbide, vanadium carbide, zirconium carbide, hafnium carbide, tantalum carbide, molybdenum carbide, niobium carbide, and tungsten carbide;

a first heat sink region contacting the first cutting portion, and a second heat sink region contacting the second cutting portion;

wherein the first heat sink region comprises a heat sink material having a thermal conductivity greater than a thermal conductivity of the first cutting portion and is adapted to conduct heat from the first cutting portion; and wherein the second heat sink region comprises a heat sink material having a thermal conductivity greater than a thermal conductivity of the second cutting portion and is adapted to conduct heat from the second cutting portion; and wherein the cutting insert is an indexable cutting insert.

2. The cutting insert of claim 1, further comprising a central hole extending between the first cutting portion and the second cutting portion.

3. The cutting insert of claim 1, wherein the cutting insert is adapted for at least one of milling, turning, and drilling.

4. The cutting insert of claim 1, further comprising a body portion supporting the first cutting portion and the second cutting portion.

5. The cutting insert of claim 4, wherein: the first heat sink portion contacts the body portion; and the second heat sink portion contacts the body portion.

6. The cutting insert of claim 4, wherein at least one of the first heat sink region and the second heat sink region comprises at least a portion of the body portion.

7. The cutting insert of claim 4, wherein the body portion comprises a recess, and wherein at least a portion of at least one of the first heat sink portion and the second heat sink portion is disposed within the recess.

8. The cutting insert of claim 7, wherein at least one of the first heat sink portion and the second heat sink portion comprises a solid plug that forms a mechanical seal within the recess and defines a void within the body portion, and further comprises a powder within the void.

9. The cutting insert of claim 7, wherein at least one of the first heat sink portion and the second heat sink portion comprises:

a first dispersed phase comprising hard particles;

a first continuous phase comprising a binder, wherein the hard particles of the first dispersed phase are dispersed within the first continuous phase; and a second continuous phase comprising the heat sink material of the heat sink portion.

10. The cutting insert of claim 1, wherein:

the first heat sink region is mechanically attached to the body portion by at least one of press fitting, shrink fitting, a fastener, soldering, brazing, an adhesive, and clamping; and the second heat sink region is mechanically attached to the body portion by at least one of press fitting, shrink fitting, a fastener, soldering, brazing, an adhesive, and clamping.

11. The cutting insert of claim 1, wherein: the binder of the cemented carbide of the first cutting portion comprises at least one of cobalt, nickel, and iron; and the binder of the cemented carbide of the second cutting portion comprises at least one of cobalt, nickel, and iron.

12. The cutting insert of claim 1, wherein the cemented carbide of each of the first cutting portion and the second cutting portion comprises hard particles of tungsten carbide and a binder comprising cobalt.

13. The cutting insert of claim 1, wherein:

the heat sink material of the first heat sink region has a thermal conductivity greater than 150 W/mK; and the heat sink material of the second heat sink region has a thermal conductivity greater than 150 W/mK.

14. The cutting insert of claim 1, wherein:

the heat sink material of the first heat sink region comprises a material selected from copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof; and the heat sink material of the second heat sink region comprises a material selected from copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof.

15. The cutting insert of claim 1, wherein:

the first heat sink region comprises at least one of a solid and a powder; and the second heat sink region comprises at least one of a solid and a powder.

* * * * *